(12) United States Patent
Wolff et al.

(10) Patent No.: US 10,737,395 B2
(45) Date of Patent: Aug. 11, 2020

(54) MOBILE ROBOT DOCKING SYSTEMS AND METHODS

(71) Applicant: iRobot Corporation, Bedford, MA (US)

(72) Inventors: Andrew Vincent Wolff, Norfolk, MA (US); Douglas Dell'Accio, Boston, MA (US); Leo Torrente, Somerville, MA (US); William Morris, Wakefield, MA (US); Flavia Pastore, Wakefield, MA (US)

(73) Assignee: iRobot Corporation, Bedford, MA (US)

( * ) Notice: Subject to any disclaimer, the term of this patent is extended or adjusted under 35 U.S.C. 154(b) by 203 days.

(21) Appl. No.: 15/858,550

(22) Filed: Dec. 29, 2017

(65) Prior Publication Data

US 2019/0202064 A1    Jul. 4, 2019

(51) Int. Cl.
*B25J 11/00*    (2006.01)
*A47L 9/28*    (2006.01)
(Continued)

(52) U.S. Cl.
CPC ............. *B25J 11/0085* (2013.01); *A47L 5/22* (2013.01); *A47L 9/009* (2013.01); *A47L 9/0411* (2013.01);
(Continued)

(58) Field of Classification Search
None
See application file for complete search history.

(56) References Cited

U.S. PATENT DOCUMENTS

| 8,984,708 B2 | 3/2015 | Kuhe et al. |
| 9,462,920 B1 | 10/2016 | Morin et al. |

(Continued)

FOREIGN PATENT DOCUMENTS

| CN | 109984682 A | 7/2019 |
| EP | 2717109 | 4/2014 |
| WO | 2014019224 | 2/2014 |

OTHER PUBLICATIONS

European Search Report for corresponding EP Application No. 18212720.9 dated Apr. 4, 2019, 4 pages.
(Continued)

*Primary Examiner* — Nicholas K Wiltey
(74) *Attorney, Agent, or Firm* — Schwegman Lundberg & Woessner, P.A.

(57) ABSTRACT

A mobile robot system includes a docking station and a mobile robot. The docking station includes a platform, first and second charging contacts on the platform, and first and second ramp features on the platform. The robot includes a housing, first and second drive wheels, first and second raised charging contacts on a bottom of the housing, and a cleaning module including at least one rotatable cleaning head that extends below the bottom of the housing. The robot is movable from an approach position with the robot spaced apart from a front of the platform to a docked position with the robot on the platform and the docking station charging contacts engaged with the robot charging contacts. As the robot moves from the approach position to the docked position, the robot engages the first and second ramp features and the cleaning mechanism is lifted over the docking station charging contacts.

20 Claims, 20 Drawing Sheets

(51) Int. Cl.

| | | |
|---|---|---|
| *B60L 53/14* | (2019.01) | |
| *A47L 5/22* | (2006.01) | |
| *A47L 9/00* | (2006.01) | |
| *A47L 9/04* | (2006.01) | |
| *A47L 9/10* | (2006.01) | |
| *A47L 9/14* | (2006.01) | |
| *B25J 5/00* | (2006.01) | |
| *B25J 9/00* | (2006.01) | |
| *G05D 1/02* | (2020.01) | |
| *H02J 7/00* | (2006.01) | |

(52) U.S. Cl.
 CPC ............. *A47L 9/0466* (2013.01); *A47L 9/106* (2013.01); *A47L 9/14* (2013.01); *A47L 9/2826* (2013.01); *A47L 9/2873* (2013.01); *B25J 5/007* (2013.01); *B25J 9/0003* (2013.01); *B60L 53/14* (2019.02); *G05D 1/0225* (2013.01); *H02J 7/0042* (2013.01); *A47L 2201/02* (2013.01); *A47L 2201/022* (2013.01); *A47L 2201/024* (2013.01); *A47L 2201/04* (2013.01)

(56) References Cited

U.S. PATENT DOCUMENTS

| | | | |
|---|---|---|---|
| 9,468,349 B2 | 10/2016 | Fong et al. | |
| 9,492,048 B2 | 11/2016 | Won et al. | |
| 9,538,892 B2 | 1/2017 | Fong et al. | |
| 9,788,698 B2 | 10/2017 | Morin et al. | |
| 9,888,818 B2 | 2/2018 | Kuhe et al. | |
| 9,924,846 B2 | 3/2018 | Morin et al. | |
| 9,931,007 B2 | 4/2018 | Morin et al. | |
| 10,154,768 B2 | 12/2018 | Morin et al. | |
| 2012/0011676 A1* | 1/2012 | Jung ........................ | A47L 9/106 15/301 |
| 2015/0314453 A1* | 11/2015 | Witelson ................ | H02J 50/90 320/108 |
| 2016/0183752 A1 | 6/2016 | Morin et al. | |
| 2017/0055796 A1 | 3/2017 | Won et al. | |
| 2017/0105592 A1 | 4/2017 | Fong et al. | |
| 2018/0008111 A1 | 1/2018 | Morin et al. | |
| 2018/0014709 A1 | 1/2018 | O'Brien et al. | |
| 2018/0125312 A1 | 5/2018 | Kuhe et al. | |
| 2018/0177369 A1 | 6/2018 | Morin et al. | |
| 2019/0176633 A1* | 6/2019 | Booth ..................... | B60L 53/16 |
| 2019/0176637 A1* | 6/2019 | Booth ..................... | B60L 53/35 |
| 2020/0044386 A1* | 2/2020 | Pabouctsidis ...... | H01R 12/7005 |

OTHER PUBLICATIONS

Communication pursuant to Article 94(3) EPC for corresponding EP application No. 18212720.9, dated Apr. 17, 2019, 6 pages.
"Deebot D79 Self-emptying Multi-surface Floor Vacuum Robot," Ecovacs Robotics, 2015, Retrieved from the Internet at URL https://ecovacsrobotics.com/ecovacs-robotics-products/deebot-floor-cleaning-robots/d7-series/d79/, 10 pages.
Deebot D77 Instruction Manual, Ecovacs Robotics, Inc., Copyright 2013, 20 pages.
Deebot D79 Instruction Manual, Ecovacs Robotics, Inc., copyright 2015, 72 pages.
Karcher, "Product Manual Download Karch", available at www.karcher.com, 2004, 18 pages.
Maschinemarkt Wurzburg, Robovac1999, 105, No. 27, pp. 3, 30, Jul. 5, 1999 (with English translation).
'Samsung.com' (online]. "SR8900 Robot VC with Auto-Emptying Dust Bin, 40 W," copyright 1995-2015 (retrieved on Dec. 9, 2015]. Retrieved from the Internet at URL http://www.samsung.com/au/consumer/home-appliances/vacuum-cleaners/roboUVCR8980L4K/XSA, 7 pages.
Hitachi: News release: "The home cleaning robot of the autonomous movement type (experimental machine)," Retrieved from the Internet: www.i4u.com./japanreleases/hitiachirobot.htm, Mar. 2005, 5 pages.
Karcher "Karcher RoboCleaner RC 3000," Retrieved from the Internet: URL: www.robocleaner.de/english/screen3.html, accessed Dec. 2003, 4 pages.
Karcher USA, RC3000 Robotic Cleaner, website: http://www.karchemsa.com/showproducts.php?cp=viewprod&paraml=143&param2=&param3=,, accessed Mar. 2005, 3 pages.
Taniguchi, "Lobo cleaner TORNEO ROBO earning garbage on the charging base from Toshiba, cleaning up to the corner with a long brush," Aug. 21, 2014, retrieved from the Internet at URL: http://japanese.engadget.com/2014/08/21/tomeo-robo/, 12 pages, English translation included.
Deebot 7 Instruction Manual, Ecovacs Robotics, Mar. 5, 2016, 26 pages.
Samsung, Vacuum Cleaning Robot user manual, SR8980, copyrights 2006, 2009, 2010, 56 pages.
"European Application Serial No. 18212720.9, Communication Pursuant to Article 94(3) EPC dated Apr. 17, 2019", 6 pgs.
"European Application Serial No. 18212720.9, Response filed Aug. 27, 2019 to Communication Pursuant to Article 94(3) EPC dated Apr. 17, 2019", 11 pgs.

\* cited by examiner

MOBILE ROBOT DOCKING SYSTEMS AND METHODS

FIELD

The present invention relates generally to robotic systems and, more specifically, to docking systems for mobile robots.

BACKGROUND

Automated robots and robotic devices are used to perform tasks traditionally considered mundane, time-consuming, or dangerous. As the programming technology increases, so too does the demand for robots that require a minimum of human interaction for tasks such as robot refueling, testing, and servicing. A goal is a robot that could be configured a single time, which would then operate autonomously, without need for human assistance or intervention.

SUMMARY OF THE INVENTION

According to embodiments of the invention, a mobile robot system includes a docking station and a mobile robot. The docking station includes a platform having a front and a rear, first and second raised charging contacts on the platform, and first and second ramp features on the platform. The mobile robot includes a housing, a motorized drive system connected to the housing and including first and second drive wheels, first and second charging contacts on a bottom of the housing, and a cleaning module including at least one rotatable cleaning head that extends below the bottom of the housing. The mobile robot is movable from an approach position with the mobile robot spaced apart from the front of the platform to a docked position with the mobile robot on the platform and the docking station charging contacts engaged with the mobile robot charging contacts. As the mobile robot moves from the approach position to the docked position, the mobile robot engages the first and second ramp features and the cleaning module is lifted over the docking station charging contacts.

According to embodiments of the invention, a method for docking a mobile cleaning robot with a docking station includes: advancing the mobile cleaning robot onto a platform of the docking station; while advancing the mobile cleaning robot onto the platform of the docking station, lifting a cleaning mechanism that extends below a bottom of a housing of the robot over at least one charging contact on the platform by advancing the robot over at least one elongated ramp feature on the platform; and docking the robot in a docked position on the platform with at least one charging contact on the bottom of the housing of the robot engaging the at least one charging contact on the platform and with the cleaning mechanism positioned between the at least one charging contact on the platform and a rear of the platform.

Further features, advantages and details of the present invention will be appreciated by those of ordinary skill in the art from a reading of the figures and the detailed description of the embodiments that follow, such description being merely illustrative of the present invention.

BRIEF DESCRIPTIONS OF THE DRAWINGS

DETAILED DESCRIPTION OF EMBODIMENTS OF THE INVENTION

Figure 1:
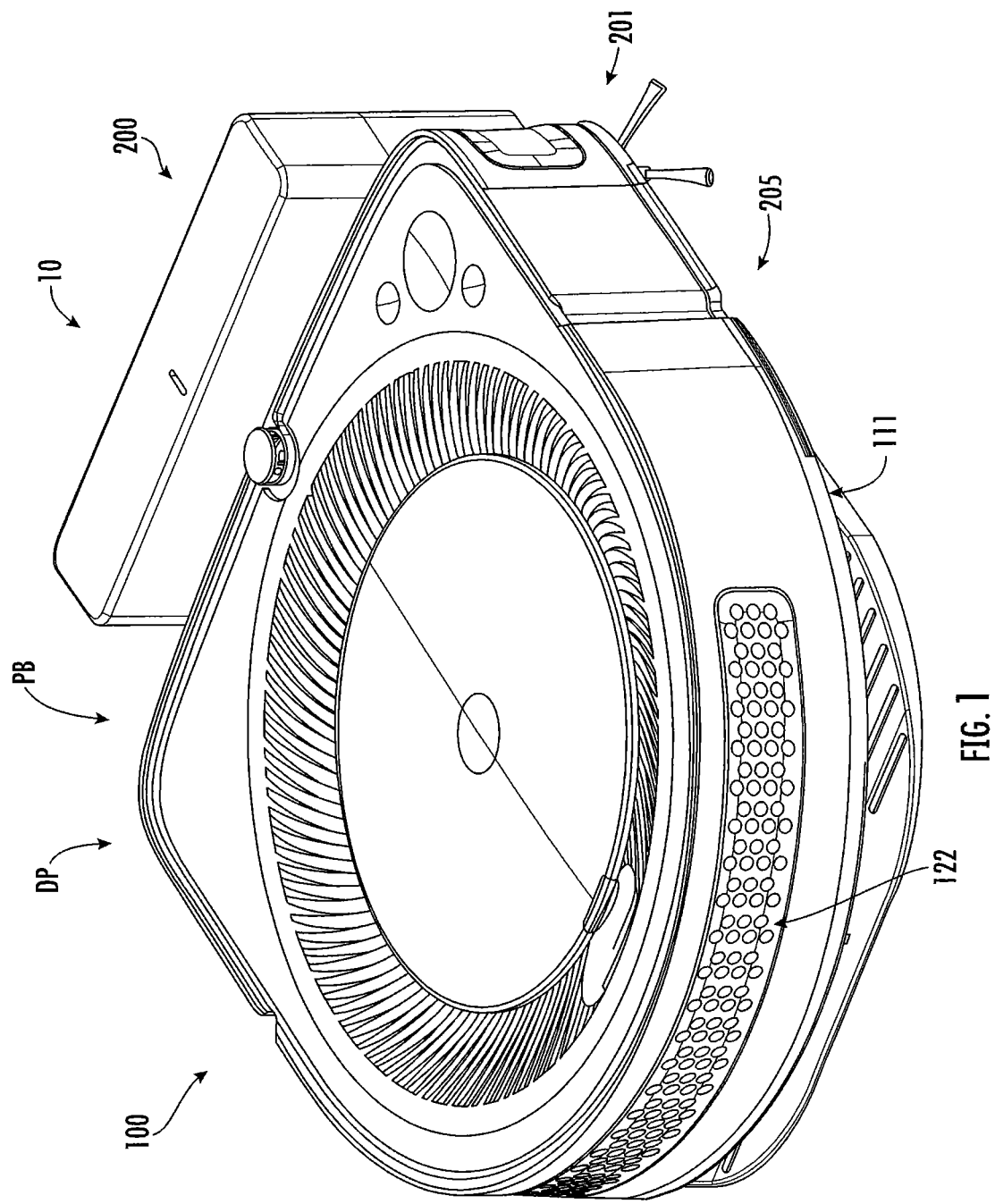
FIG. 1 is a perspective view of a mobile robot system according to embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "monolithic" means an object that is a single, unitary piece formed or composed of a material without joints or seams.

With reference to FIGS. 1-14, a mobile robot system 10 according to some embodiments is shown therein. The system 10 includes a vacuum cleaning robot 100 and a base station or dock 200 (also referred to herein as a docking station). The system 10 may include an evacuation dock 300 (FIG. 14) in addition to or in place of the dock 200. The robot 100 is adapted to mate with the dock 200 and the evacuation dock 300.

The system 10 also includes a charging or energy management system 205 and an auto-docking control system 201 each including cooperatively operating components of the robot 100 and the dock 200. In some embodiments, the energy management system 205 includes a charging circuit (including charging contacts 222A, 222B in the dock 200 and charging contacts 164A, 164B in the robot 100) to enable charging of the robot 100 by the dock 200.

In the following description of the autonomous robot 100, use of the terminology "forward/fore" refers generally to the primary direction of motion of the robot 100, and the terminology fore-aft axis (see reference characters "FA" in FIG. 4) defines the forward direction of motion F (FIG. 4), which is coincident with the fore-aft diameter of the robot 100.

The robot 100 further defines a lateral or left-right axis LA and a vertical axis VA that are perpendicular to one another and to the axis FA. The axes FA and LA define a plane that is substantially parallel to the plane defined by the points of contact of the wheels 132 and caster 134 (described below) or the support surface (e.g., floor) on which the robot 100 rests.

Figure 5:
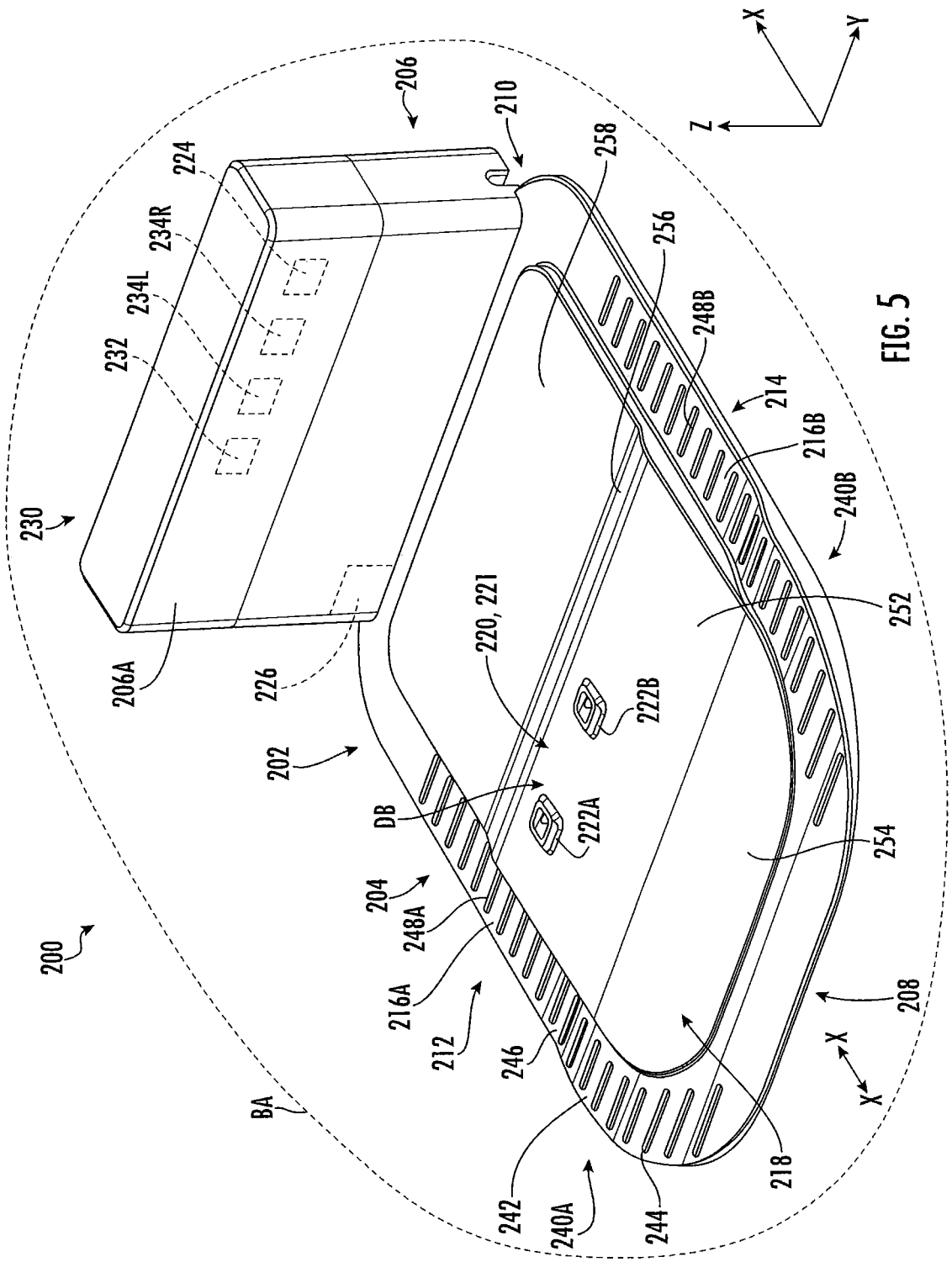
FIG. 5 is a perspective view of a dock forming a part of the system of FIG. 1.

The description also uses a frame of reference based on the dock 200 including X-, Y- and Z-axes, which are depicted in FIG. 5. The X-, Y- and Z-axes are perpendicular to one another and intersect at the center of the dock 200. Movements, distances and dimensions along the Y-axis may be referred to as lateral, leftward or rightward. Movements, distances and dimensions along the X-axis may be referred to herein as depthwise, fore-aft, forward or rearward. Movements, distance and dimensions along the Z-axis may be referred to herein as vertical. The X- and Y-axes define a plane that is parallel to the support surface on which the dock 200 rests (e.g., a floor).

In the embodiment depicted, the robot 100 includes a robot controller 102, a body, housing infrastructure or housing (hereinafter, "housing") 111, an electrical energy storage battery 126, a motive system 130, a cleaning system 140, a detector system 150, and an energy management or charging subsystem 160. The detector system 150 forms a part of the auto-docking control system 201.

Figure 2:
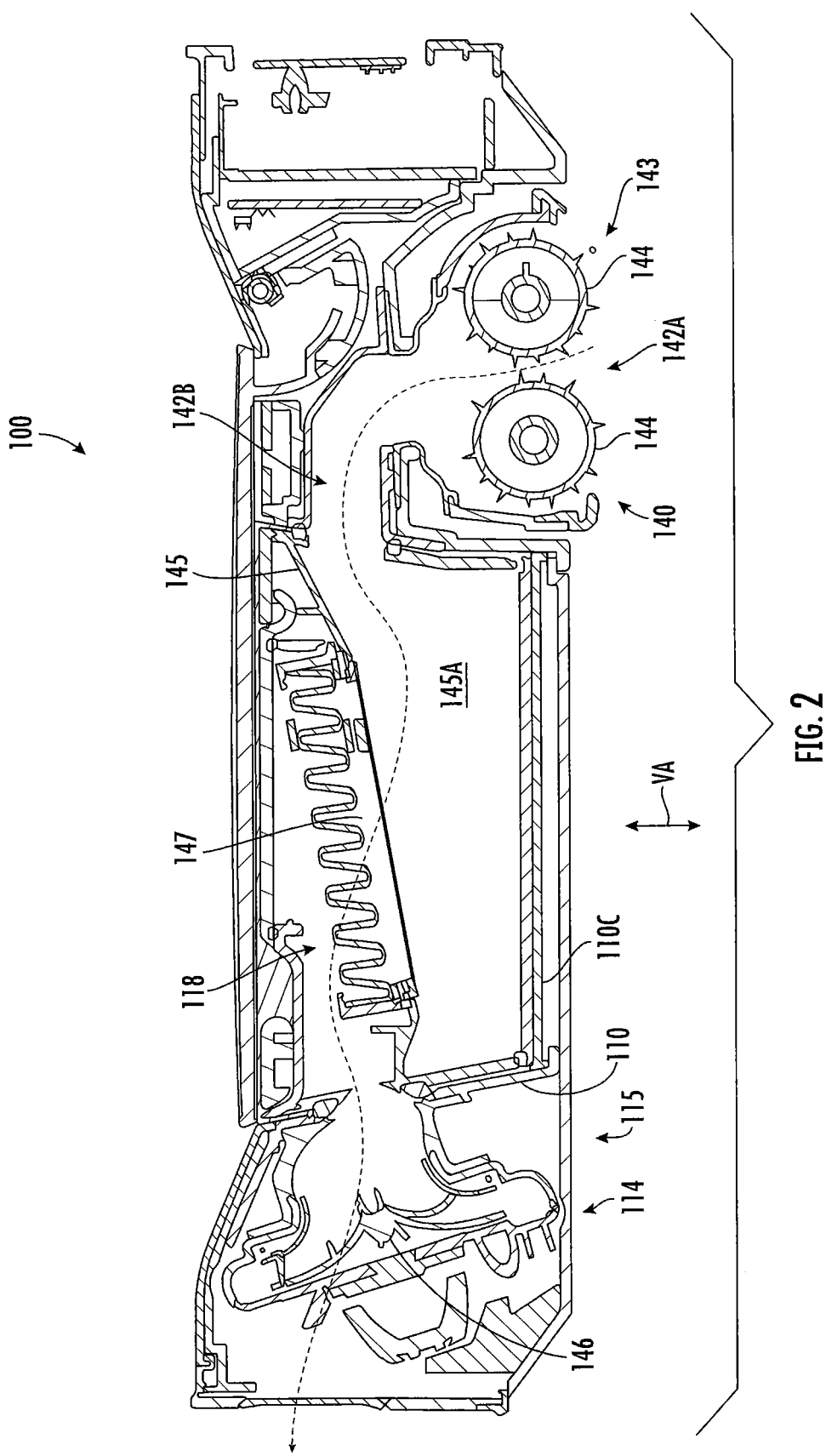
FIG. 2 is a cross-sectional view of a robot forming a part of the system of FIG. 1.

The housing 111 has an undercarriage 115 (FIG. 3) and defines an internal main chamber 118 (FIG. 2). The undercarriage 115 forms the underside or bottom side of the housing 111 and the robot 100. The housing 111 includes a chassis 110, a top cover 112, a bottom or undercarriage cover 114, and a displaceable bumper 116. The robot 100 may move in a forward direction F and a reverse drive direction R; consequently, the chassis 110 has corresponding forward and back ends, 110A and 110B, respectively.

The chassis 110 may be molded from a material such as plastic as a unitary or monolithic element that includes a plurality of preformed wells, recesses, and structural members for, inter alia, mounting or integrating elements of the various subsystems that operate the robot 100. The covers 112, 114 may be molded from a material such as a polymeric material (plastic) as respective unitary or monolithic elements that are complementary in configuration with the chassis 110 and provide protection of and access to elements and components mounted to the chassis 110. The chassis 110 and the covers 112, 114 are detachably integrated in combination by any suitable means (e.g., screws). In some embodiments and as shown, the housing 111 has a front end defining a square profile. In some embodiments, the chassis 110 and covers 112, 114 form a structural envelope of minimal height having a generally D-shaped configuration that is generally symmetrical along the fore-aft axis FA.

An evacuation port 120 is defined in the undercarriage cover 114 and the bottom wall 110C of the chassis 110. The evacuation port 120 may be provided with a closure device or flap.

The displaceable bumper 116 has a shape generally conforming to that of the front end of the chassis 110 and is mounted in movable combination at the forward portion of the chassis 110 to extend outwardly therefrom (the "normal operating position"). The mounting configuration of the displaceable bumper 116 is such that it is displaced towards the chassis 110 (from the normal operating position) whenever the bumper 116 encounters a stationary object or obstacle of predetermined mass (the "displaced position"), and returns to the normal operating position when contact with the stationary object or obstacle is terminated (due to operation of a control sequence which, in response to any such displacement of the bumper 116, implements a "bounce" mode that causes the robot 100 to evade the stationary object or obstacle and continue its task routine).

Installed along either lateral side of the chassis 110 are independent drive wheels 132 that mobilize the robot 100 and provide two points of contact with the floor surface. The drive wheels 132 may be spring loaded. The rear end 110B of the chassis 110 includes a non-driven, multi-directional caster wheel 134 that provides additional support for the robot 100 as a third point of contact with the floor surface. One or more electric drive motors 136 are disposed in the housing 111 and operative to independently drive the wheels 132. The motive components may include any combination of motors, wheels, drive shafts, or tracks as desired, based on cost or intended application of the robot 100.

In some embodiments, the cleaning system 140 includes a suction slot or opening 142A defined in the undercarriage 115. One or more motor driven rotating cleaning mechanisms or extractors (e.g., brushes, cleaning heads, or rollers) 144 flank the opening 142A. A cleaning module 143 may include the extractors 144. An electric vacuum fan 146 pulls air up through a gap between the extractors 144 to provide a suction force that assists the extractors in extracting debris from the floor surface. Air and debris that pass through the gap are routed through a plenum 142B that leads to an opening of a cleaning or debris bin 145 disposed or encased in the chamber 118. The opening leads to a debris collection cavity 145A of the debris bin 145. A filter 147 located above the cavity screens the debris from an air passage leading to the air intake of the vacuum fan 146. Filtered air exhausted from the vacuum fan 146 is directed through an exhaust port 122.

A side brush 148 is mounted along the sidewall of the chassis 110 proximate the forward end 110A and ahead of the extractors 144 in the forward drive direction F. The side brush 148 rotatable about an axis perpendicular to the floor surface. The side brush 148 allows the robot 100 to produce a wider coverage area for cleaning along the floor surface. In particular, the side brush 148 may flick debris from outside the area footprint of the robot 100 into the path of the centrally located cleaning head assembly.

Other suitable configurations for the vacuum cleaning system are disclosed in U.S. Pat. No. 9,215,957 to Cohen et al., U.S. Publication No. 2016/0166126 to Morin et al., and U.S. Pat. No. 8,881,339 to Gilbert, Jr. et al. the disclosures of which are incorporated herein by reference.

The robot controller circuit 102 (depicted schematically) is carried by the chassis 110. The robot controller 102 is configured (e.g., appropriately designed and programmed) to govern over various other components of the robot 100 (e.g., the extractors 144, the side brush 148, and/or the drive wheels 132). As one example, the robot controller 102 may provide commands to operate the drive wheels 132 in unison to maneuver the robot 100 forward or backward. As another example, the robot controller 102 may issue a command to operate one drive wheel 132 in a forward direction and the other drive wheel 132 in a rearward direction to execute a clock-wise turn. Similarly, the robot controller 102 may provide commands to initiate or cease operation of the rotating extractors 144 or the side brush 148. In some embodiments, the robot controller 102 is designed to implement a suitable behavior-based-robotics scheme to issue commands that cause the robot 100 to navigate and clean a floor surface in an autonomous fashion. The robot controller 102, as well as other components of the robot 100, may be powered by the battery 126 disposed on the chassis 110.

The detector system 150 (FIG. 4) includes a top or communications/guidance signal receiver or detector 152, proximity or wall following sensors 153, cliff sensors 154, a forward directional receiver or detector 156, an optical mouse sensor 157, and a camera 159. In some embodiments, each of these sensors or detectors is communicatively coupled to the robot controller 102. The robot controller 102 implements the behavior-based-robotics scheme based on feedback received from the plurality of sensors distributed about the robot 100 and communicatively coupled to the robot controller 102.

The proximity sensors 153 (depicted schematically) are installed along the periphery of the robot 100 proximate the front corners of the robot 100. The proximity sensors 153 are responsive to the presence of potential obstacles that may appear in front of or beside the robot 100 as the robot 100 moves in the forward drive direction F.

The cliff sensors 154 are installed along the forward end 110A of the chassis 110. The cliff sensors 154 are designed to detect a potential cliff, or flooring drop, forward of the robot 100 as the robot 100 moves in the forward drive direction F. More specifically, the cliff sensors 154 are responsive to sudden changes in floor characteristics indicative of an edge or cliff of the floor surface (e.g., an edge of a stair).

The communications/guidance signal detector 152 is mounted on the top front of the housing 111 of the robot 100. The detector 152 is operable to receive signals projected from an emitter (e.g., the avoidance signal emitter 232 and/or the homing and alignment emitters 234R, 234L of the dock 200) and (optionally) an emitter of a navigation or virtual wall beacon. In some embodiments, the robot controller 102 may cause the robot 100 to navigate to and dock with the dock 200 in response to the communications detector 152 receiving a home signal emitted by the dock 200.

In some embodiments and as shown, the detector 152 is mounted at the highest point on the robot 100 and toward the front of the robot 100 as defined by the primary traveling direction, as indicated by an arrow on axis FA. In alternative embodiments, multiple detectors can be used in place of the top signal detector 152. Such an embodiment might include using multiple side-mounted sensors or detectors. Each of the sensors can be oriented in a manner so that a collective field of view of all the sensors corresponds to that of the single, top mounted sensor. Because a single, omni-directional detector is mounted at the highest point of the robot for optimal performance, it is possible to lower the profile of the robot by incorporating multiple, side mounted detectors.

The forward directional detector 156 is mounted on the front end of the robot 100 and may be mounted on or behind the bumper 116. The forward directional detector 156 receives signals projected from the emitters 234R, 234L on the dock 200. In other embodiments, a pair of detectors receive signals from the emitters 234R, 234L or more than two detectors may be used.

In some embodiments, the detectors 154, 156 are infrared ("IR") sensor or detector modules, that include a photodiode and related amplification and detection circuitry, in conjunction with an omni-directional lens, where omni-directional refers to a substantially single plane. Any detector, regardless of modulation or peak detection wavelength, can be used as long as the emitters 232, 234R, 234L on the base dock 200 are adapted to match the detectors 152, 156 on the robot 100. In another embodiment, IR phototransistors may be used with or without electronic amplification elements and may be connected directly to the analog inputs of a microprocessor. Signal processing may then be used to measure the intensity of IR light at the robot 100, which provides an estimate of the distance between the robot 100 and the source of IR light.

The camera 159 is a vision based sensor, such as a camera, having a field of view optical axis oriented in the forward drive direction of the robot 100. In the illustrated embodiment, the camera 159 is located at the rear end 110A of the robot with its line of sight angled forwardly and upwardly over the detector 152. In some embodiments, the camera 159 is a video camera. In some embodiments, the camera 159 is used for detecting features and landmarks in the operating environment and building a map using Video Simultaneous Localization and Mapping (VSLAM) technology.

Figure 4:
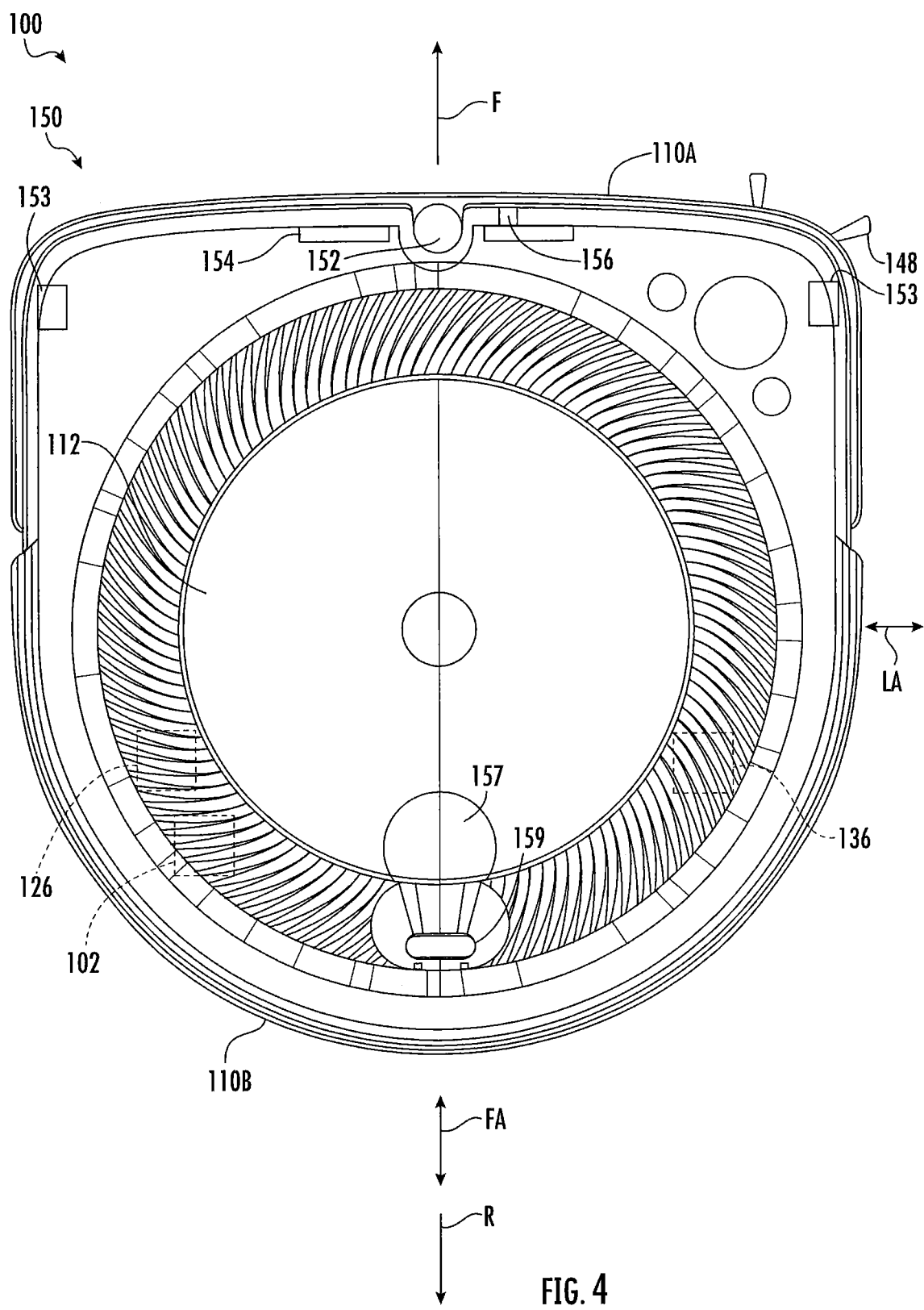
FIG. 4 is a top view of the robot of FIG. 2.

The optical mouse sensor 157 is located on the undercarriage 115 of the robot 100. The circle shown in the top view of FIG. 4 shows relative placement of the optical mouse sensor 157; however, the sensor 157 would not be visible in this view. The mouse sensor 157 tracks flooring and assists with drift compensation to keep the robot 100 moving in straight ranks.

Various other types of sensors, though not shown in the illustrated examples, may also be incorporated in the robot 100 without departing from the scope of the present disclosure. For example, a tactile sensor responsive to a collision of the bumper 116 and/or a brush-motor sensor responsive to motor current of the brush motor may be incorporated in the robot 100.

The robot 100 may further include a bin detection system for sensing an amount of debris present in the cleaning bin 122 (e.g., as described in U.S. Patent Publication 2012/0291809, the entirety of which is hereby incorporated by reference).

The robot charging subsystem 160 includes a charging circuit 162 that includes the charging contacts 164A, 164B. The robot charging subsystem 160 forms a part of the energy management system 205.

The robot 100 may be modified to perform any suitable task(s). For example, the robot 100 may be used for floor waxing and polishing, floor scrubbing, ice resurfacing (as typically performed by equipment manufactured under the brand name Zamboni®), sweeping and vacuuming, unfinished floor sanding and stain/paint application, ice melting and snow removal, grass cutting, etc. In some embodiments, the robot is configured as a mobility base carrying a retractable mast on which a camera is mounted. Any number of components may be required for such tasks, and may each be incorporated into the robot 100, as necessary. For simplicity, this application will describe vacuuming as the demonstrative predetermined task. The energy management and auto-docking functions disclosed herein have wide application across a variety of robotic systems.

FIG. 5 is a schematic perspective view of a dock 200 in accordance with one embodiment of the invention. The dock 200 includes a housing 202 including both a substantially horizontal base plate or platform 204 and a substantially vertical tower or backstop 206. The platform 204 includes a front 208 and a rear 210. The backstop 206 is at the rear 210 of the platform 204. A docking bay DB is defined over the platform 204 and in front of the backstop 206. The dock 200 may be any of a variety of shapes or sizes, providing sufficient space for the desired components and systems, described below.

The platform 204 includes a left side portion 212 and a right side portion 214. A first or left track 216A is on the left side portion 212 of the platform 204 and a second or right track 216B is on the right side portion 212 of the platform 204. The platform 204 includes a central portion 218 between the left and right side portions 212, 214.

The, platform 204 is generally parallel to the ground surface on which the dock 200 rests or may be slightly ramped to provide space for wiring.

The dock 200 includes a dock charging subsystem 220, a communications/guidance system 230, a dock controller 224, and a power input connector 226 (connected to a power supply, not shown). The dock charging subsystem 220 forms a part of the energy management system 205. The dock charging subsystem 220 includes a charging circuit 221, which includes first and second charging contacts 222A, 222B on the central portion 218 of the platform 204. As described in more detail below, the charging contacts 222A, 222B are configured to engage the charging contacts 164A, 164B of the robot 100 (FIG. 3) when the robot 100 is in a docked position on the dock 200. The charging contacts 222A, 222B may be spring loaded.

The dock controller circuit 224 (depicted schematically) is carried by the housing 202. The dock controller 224 is configured (e.g., appropriately designed and programmed) to govern over various other components of the dock 200.

The communications/guidance system 230 (FIG. 5) may include a top signal emitter 232, a first or right front homing/alignment emitter 234R, and a second or left front homing/alignment emitter 234L.

The top signal emitter 232 may be mounted on the top of the backstop 206. The emitter 232 generates a first signal, such as an avoidance signal BA (FIG. 5), in a diffuse region near the dock 200 to prevent the robot from coming into inadvertent direct contact with the dock 200 while performing a task, such as vacuuming. The top signal emitter 232 may utilize a parabolic reflector to transmit the avoidance signal. In such an embodiment, the avoidance signal is emitted by a single LED directed at a lens whose geometry is determined by rotating a parabola about its focus. This parabolic reflector thus projects the avoidance signal BA without the necessity of multiple emitters. A similar configuration can be employed in the detector 156 on the robot, with a single receiver used in place of the single LED.

The homing/alignment emitters 234R, 234L are located on a front wall 206A of the backstop 206. The homing/alignment emitters 234R and 234L emit or project respective homing signals BR and BQ (FIG. 7) as discussed below. In some embodiments, the emitters 234R, 234L are LEDs. The emitters 234R, 234L serve as navigational buoys or fiducials. In some embodiments and as shown, the emitters 234R, 234L are laterally offset from the centerline X-X of the dock 200 and the directional detector 156 is offset from the centerline FA of the robot 100 so that the detector 156 is substantially centered between the emitters 234R, 234L when the robot 100 is in the docked position.

The robot 100 uses a variety of behavioral modes to effectively vacuum a working area. Behavioral modes are layers of control systems that can be operated in parallel. The robot controller 102 (e.g., microprocessor) is operative to execute a prioritized arbitration scheme to identify and implement one or more dominant behavioral modes for any given scenario, based upon inputs from the sensor system. The robot controller 102 is also operative to coordinate avoidance, homing, and docking maneuvers with the dock 200.

Generally, the behavioral modes for the described robot 100 can be characterized as: (1) coverage behavioral modes; (2) escape behavioral modes, and (3) safety behavioral modes. Coverage behavioral modes are primarily designed to allow the robot 100 to perform its operations in an efficient and effective manner, while the escape and safety behavioral modes are priority behavioral modes implemented when a signal from the sensor system indicates that normal operation of the robot 100 is impaired (e.g., obstacle encountered), or is likely to be impaired (e.g., drop-off detected).

Representative and illustrative coverage behavioral modes (for vacuuming) for the robot 100 include: (1) a Spot Coverage pattern; (2) an Obstacle-Following (or Edge-Cleaning) Coverage pattern, and (3) a Room Coverage pattern. The Spot Coverage pattern causes the robot 100 to clean a limited area within the defined working area, e.g., a high-traffic area. In a certain embodiments the Spot Coverage pattern is implemented by means of a spiral algorithm (but other types of self-bounded area algorithms, such as polygonal, can be used). The spiral algorithm, which causes outward or inward spiraling movement of the robot 100, is implemented by control signals from the microprocessor to the motive system to change the turn radius/radii thereof as a function of time or distance traveled (thereby increasing/decreasing the spiral movement pattern of the robot 100).

The foregoing description of typical behavioral modes for the robot 100 are intended to be representative of the types of operating modes that can be implemented by the robot 100. One skilled in the art will appreciate that the behavioral modes described above can be implemented in other combinations and other modes can be defined to achieve a desired result in a particular application.

A navigational control system may be used advantageously in combination with the robot 100 to enhance the cleaning efficiency thereof, by adding a deterministic component (in the form of a control signal that controls the movement of the robot 100) to the motion algorithms, including random motion, autonomously implemented by the robot 100. The navigational control system operates under the direction of a navigation control algorithm. The navigation control algorithm includes a definition of a predetermined triggering event.

Broadly described, the navigational control system, under the direction of the navigation control algorithm, monitors the movement activity of the robot 100. In one embodiment, the monitored movement activity is defined in terms of the "position history" of the robot 100, as described in further detail below. In another embodiment, the monitored movement activity is defined in terms of the "instantaneous position" of the robot 100.

The predetermined triggering event is a specific occurrence or condition in the movement activity of the robot 100. Upon the realization of the predetermined triggering event, the navigational control system operates to generate and communicate a control signal to the robot 100. In response to the control signal, the robot 100 operates to implement or execute a conduct prescribed by the control signal, i.e., the prescribed conduct. This prescribed conduct represents a deterministic component of the movement activity of the robot 100.

The camera 159 can be used to navigate the robot and acquire images for other operational use. In some embodiments, the camera 159 is a VSLAM camera and is used to detect features and landmarks in the operating environment and build a map.

While the robot 100 is vacuuming, it will periodically approach the stationary dock 200. Contact with the dock 200 could damage or move the dock 100 into an area that would make docking impossible. Therefore, avoidance functionality is desirable. To avoid inadvertent contact, the dock 200 may generate an avoidance signal BA, as depicted in FIG. 5. The avoidance signal BA is shown being transmitted from the emitter 232 on the top of the backstop 206. The radial range of the avoidance signal BA from the dock 200 may vary, depending on predefined factory settings, user settings, or other considerations. At a minimum, the avoidance signal BA need only project a distance sufficient to protect the dock 200 from unintentional contact with the robot 100. The avoidance signal BA range can extend from beyond the periphery of the dock 200, to up to and beyond several feet from the dock 200, depending on the application.

The avoidance signal BA may be an omni-directional (i.e., single plane) infrared beam, although other signals are contemplated, such as a plurality of single stationary beams or signals. If stationary beams are used, however, a sufficient number could provide adequate coverage around the dock 200 to increase the chances of the robot 100 encountering them. When the detector 152 of the robot 100 receives the avoidance signal BA from the emitter 232, the robot 100 can alter its course, as required, to avoid the dock 200. Alternatively, if the robot 100 is actively or passively seeking the dock 200 (for recharging or other docking purposes), it can alter its course toward the dock 200, such as by circling the dock 200, in such a way to increase the chances of encountering the homing signals as described below.

Generally, the avoidance signal BA is modulated and coded, as are the homing signals BR, BQ. The bit encoding method as well as binary codes are selected such that the robot 100 can detect the presence of each signal, even if the robot 100 receives multiple codes simultaneously.

Whenever measurable level of IR radiation from the avoidance signal BA strikes the detector 152, the robot's IR avoidance behavior is triggered. In one embodiment, this behavior causes the robot 100 to spin in place to the left until the IR signal falls below detectable levels. The robot 100 then resumes its previous motion. In one embodiment, the detector 152 acts as a gradient detector. When the robot 100 encounters a region of higher IR intensity, the robot 100 spins in place. Because the detector 152 is mounted at the front of the robot 100 and because the robot 100 does not move backward, the detector 152 always "sees" the increasing IR intensity before other parts of the robot 100. Thus, spinning in place causes the detector 152 to move to a region of decreased intensity. When the robot 100 next moves forward, it necessarily moves to a region of decreased IR intensity—away from the avoidance signal BA.

In other embodiments, the dock 200 includes multiple coded emitters at different power levels or emitters that vary their power level using a system of time multiplexing. These create concentric coded signal rings which enable the robot 100 to navigate towards the dock 200 from far away in the room. Thus, the robot 100 would be aware of the presence of the dock 200 at all times, facilitating locating the dock 200, docking, determining how much of the room has been cleaned, etc. Alternatively, the robot 100 uses its motion through the IR field to measure a gradient of IR energy. When the sign of the gradient is negative (i.e., the detected energy is decreasing with motion), the robot 100 goes straight (away from the IR source). When the sign of the gradient is positive (energy increasing), the robot 100 turns. The net effect is to implement a "gradient descent algorithm," with the robot 100 escaping from the source of the avoidance signal BA. This gradient method may also be used to seek the source of emitted signals. The concentric rings at varying power levels facilitate this possibility even without a means for determination of the raw signal strength.

In some embodiments, in order to dock, the system 10 executes a docking procedure. The docking procedure terminates with the robot 100 in a final, prescribed docked position DP (FIG. 1) within the docking bay DB. The docked position DP may include permitted tolerances or deviation from a precise target docked position.

The robot 100 may assume its seeking mode and seek the dock 200 when it detects the need to recharge its battery, or when it has completed vacuuming the room. This mode can also be triggered by actuating a hardware interface such as a button on the robot 100 and/or by using a portable electronic device (e.g., a smartphone app).

In the docking procedure, the robot 100 uses the homing signals BR, BQ (FIG. 7) and its directional detector 156 to guide the robot 100. As with the avoidance signal BA above, the projected range and orientation of the homing signals BR, BQ may be varied, as desired. It should be noted however, that longer signals can increase the chance of the robot 100 finding the dock 200 efficiently. Longer signals can also be useful if the robot 100 is deployed in a particularly large room, where locating the dock 200 randomly could be inordinately time consuming. Homing signal BR, BQ ranges that extend from approximately six inches beyond the front of the platform 210, to up to and beyond several feet beyond the platform 210 are contemplated, depending on application. The angular width of the homing signals BR, BQ may vary depending on application, but angular widths in the range of 5° to up to and beyond 60° are contemplated. The angular width of each homing signal BR, BQ may be the area covered by the beam or sweep of the homing signal BR, BQ and, in some embodiments, is generally or substantially frusto-conical. A gradient behavior as described above can also be used to aid the robot in seeking out the dock 200.

The two homing signals BR, BQ are distinguishable by the robot 100, for example as a first or lateral right homing signal BR and a second or lateral left homing signal BQ. IR beams are generally used to produce the signals and, as such, are not visible. The IR beams may be modulated. Any signal bit pattern may be used, provided the robot 100 recognizes which signal to orient to a particular side. Alternatively, the signals BR, BQ may be distinguished by using different wavelengths or by using different carrier frequencies (e.g., 380 kHz versus 38 kHz, etc.).

Thus, when the robot 100 wants or needs to dock, if the detector 156 receives the right signal BR transmitting from the dock 200, it moves to keep the right signal BR on the robot's right side; if it detects the left signal BQ transmitting from the dock 200, it moves to keep the left signal BQ on the robot's left side. Where the two signals overlap (the overlap zone BO), the robot 100 knows that the dock 200 is nearby and may then dock. Such a system may be optimized to make the overlap zone BO as thin as practicably possible, to ensure proper orientation and approach of the robot 100 and successful docking. Alternatively, the right signal BR and left signal BQ may be replaced by a single signal, which the robot 100 would follow until docked.

Figure 7:
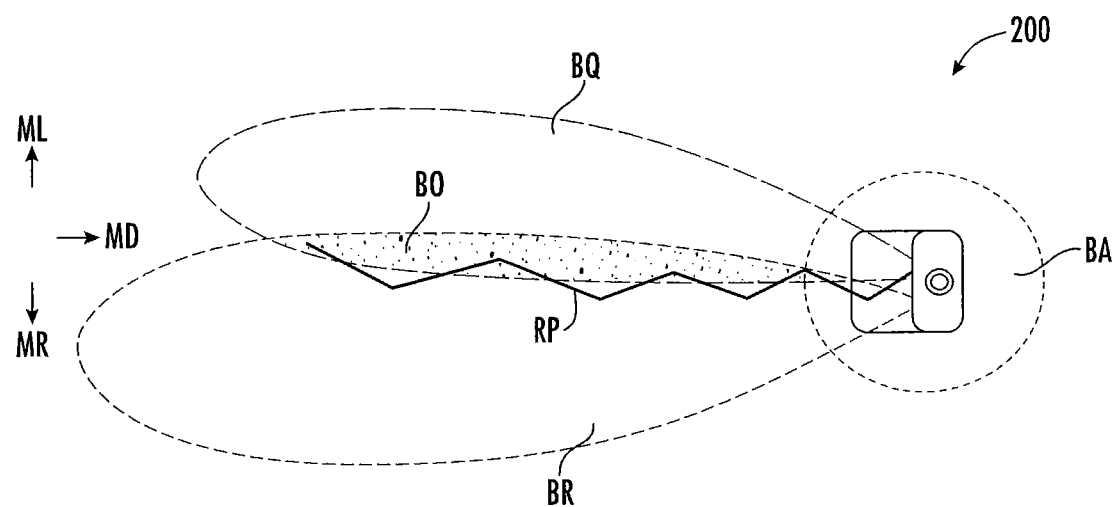
FIG. 7 is a schematic diagram illustrating operations of a communications/guidance system forming a part of the system of FIG. 1.
Figure 8:
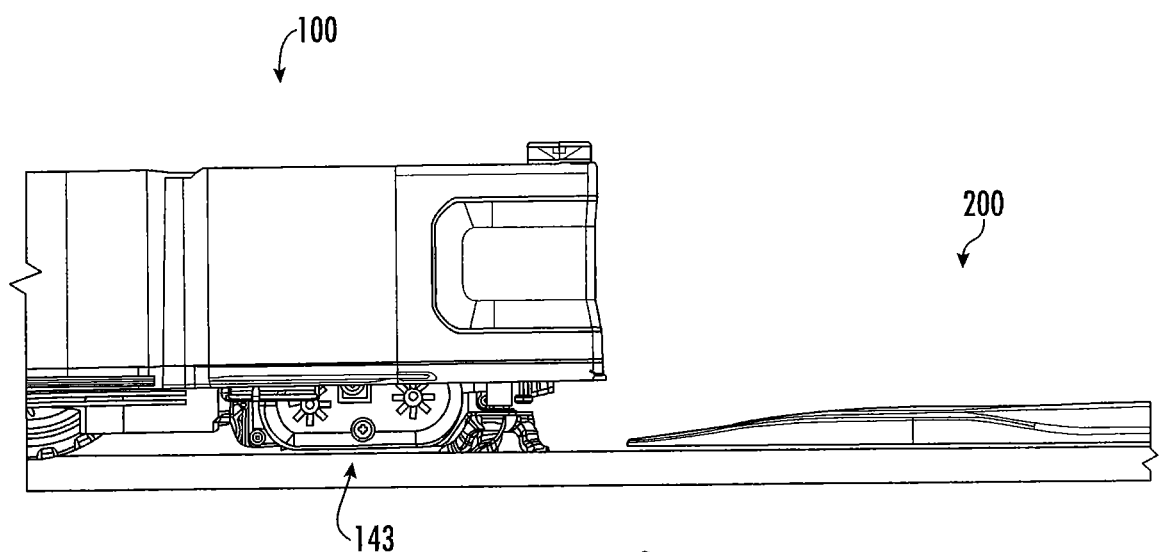
FIGS. 8-13 are sequential side views of a robot of the system of FIG. 1 advancing from an approach position to docked position on a dock of the system of FIG. 1.

FIG. 7 depicts an exemplary path RP the robot 100 may traverse during a docking procedure utilizing the homing signals. When the detector 156 is in the left signal 156 field, the robot 100 will move towards the right, in direction MR in an effort to keep that left signal BQ to the left of the robot 100. When the detector 156 is in the right signal BR field, thus the robot 100 will move towards the left, in direction ML in an effort to keep that right signal BR to the right of the detector 156. Last, when the detector 156 encounters the overlap zone BO, the robot 100 will move in direction MD directly towards the dock 100.

While approaching the dock 200, the robot 100 may slow its speed of approach and/or discontinue vacuuming, or perform other functions to ensure trouble-free docking. These operations may occur when the robot 100 detects the avoidance signal BA, thus recognizing that it is close to the dock 200, or at some other predetermined time, e.g., upon a change in the signal from the emitters 234R, 234L.

In other embodiments, the camera 159 (e.g., a VSLAM camera) is used to detect the dock 200 in order to guide the robot 100 in the docking procedure. The camera 159 may also be used to build and use a map using VSLAM technology as discussed above. For example, in some embodiments, the camera 159 is aimed upward (e.g., to view locations 3-8 feet above the floor) to view objects or features (e.g., picture frames and doorway frames and edges) for mapping and localizing the robot 100 relative to these landmarks (i.e., groupings of features).

In addition to operating as navigational beacons, homing signals BR, BQ and/or the avoidance signal BA may also be used to transmit information, including programming data, fail safe and diagnostic information, docking control data and information, maintenance and control sequences, etc. In such an embodiment, the signals can provide the control information, dictating the robot's reactions, as opposed to the robot 100 taking certain actions upon contacting certain signals from the dock 200. In that case, the robot 100 functions as more of a slave to the dock 200, operating as directed by the signals sent. In other embodiments, separate IR LEDs and emitters can be used for transmitting data, information, etc. There may be two-way communication between the robot 100 and the dock 200.

In the docking procedure, the robot 100 may use the navigational aids described herein to adjust the lateral alignment of the robot 100 with respect to the dock 200, the angular orientation of the robot 100 with respect to the dock 200, and/or the depthwise position of the robot 100 into the dock 200 (i.e., proximity to the backstop 206).

Generally, the control sequence for vacuuming can include three subsequences based on the measured energy level of the robot 100. Those are referenced generally as a high energy level, a medium energy level, and a low energy level. In the high energy level subsequence, the robot 100 performs its predetermined task, in this case, vacuuming (utilizing various behavioral modes as described above), while avoiding the dock 200. When avoiding the dock 200, the robot 100 performs its avoidance behavior and continues to operate normally This process continues while the robot 100 continually monitors its energy level. Various methods are available to monitor the energy level of the power source, such as coulometry (i.e., the measuring of current constantly entering and leaving the power source), or simply measuring voltage remaining in the power source. Other embodiments of the robot 100 may simply employ a timer and a look-up table stored in memory to determine how long the robot 100 can operate before it enters a different energy level subsequence. Still other embodiments may simply operate the robot 100 for a predetermined time period before recharging, without determining which energy level subsequence it is operating in. If the robot 100 operates on a liquid or gaseous fuel, this level may also be measured with devices currently known in the art.

Once the energy remaining drops below a predetermined high level, the robot 100 enters its medium energy level sequence. The robot 100 continues to vacuum and monitor its energy level. In the medium energy level, however, the robot 100 "passively seeks" the dock 200. While passively seeking the dock 200, the robot 100 does not alter its travel characteristics; rather, it continues about its normal behavioral mode until it detects the avoidance signal BA or a homing signal BR, BQ, each of which may be followed until the robot 100 ultimately docks with the dock 200. In other words, if the robot detects the avoidance signal BA while passively seeking, rather than avoiding the dock 200 as it normally would, it alters its travel characteristics until it detects the homing signal BR or BQ, thus allowing it to dock.

Alternatively, the robot 100 continues operating in this medium energy level subsequence until it registers an energy level below a predetermined low level. At this point, the robot 100 enters the low level subsequence, characterized by a change in operation and travel characteristics. To conserve energy, the robot 100 may discontinue powering all incidental systems, and operations, such as vacuuming, allowing it to conserve as much energy as possible for "actively searching" for the dock 200. While actively searching, the robot 100 may alter its travel characteristics to increase its chances of finding the dock 200. It may discontinue behavioral modes such as those employing a spiral movement, which do not necessarily create a higher chance of locating the dock 200, in favor of more deliberate modes, such as wall-following. This deliberate seeking will continue until the robot 100 detects the presence of the dock 200, either by detecting the avoidance signal BA or the homing signals BR, BQ. Clearly, additional subsequences may be incorporated which sound alarms when the power remaining reaches a critical level, or which reconstruct the route the robot 100 has taken since last contacting the dock 200 to aid in relocating the dock 200.

The robot 100 may also dock because it has determined that it has completed its assigned task (e.g., vacuuming a room) or its bin needs to be emptied. The robot 100 may make this determination based on a variety of factors, including considerations regarding room size, total run time, total distance traveled, dirt sensing, etc. Alternatively, the robot may employ room-mapping programs, using the dock 200 and/or walls and large objects as points of reference. Upon determining that it has completed its task, the robot 100 will alter its travel characteristics in order to find the dock 200 quickly. The dock 200 may include a charging system only (i.e., a charging dock) or may include both a charging system and an evacuation system or station operative to empty debris from the bin of the robot 100.

Once the robot 100 is in the docked position, it can recharge itself autonomously. Circuitry within the dock 200 detects the presence of the robot 100 and then switches on the charging voltage to the charging contacts 222A, 222B.

While docked with the dock 200, the robot 100 can also perform other maintenance or diagnostic checks. In certain embodiments, the robot 100 can completely recharge its power source or only partially charge it, based on various factors. Other behaviors while in the docking position such as diagnostic functions, internal mechanism cleaning, communication with network, or data manipulation functions may also be performed.

The platform 206 includes first and second ramp features such as first and second ramps 240A, 240B. The robot 100 is movable between an approach position with the robot 100 spaced apart from the platform 206 (FIG. 8) and a docked position (FIG. 13) with the robot 100 on the platform 206 and the docking station charging contacts 222A, 222B engaged with the robot charging contacts 164A, 164B. As described in more detail below, the first and second ramp features are positioned and configured such that, as the robot 100 moves from the approach position to the docked position, the robot 100 engages the ramp features and the cleaning module 143 of the robot is lifted over the docking station charging contacts 222A, 222B. The ramp features therefore help prevent the robot from damaging the docking station charging contacts as the robot drives onto the docking station platform by raising the cleaning module up and over the docking station charging contacts.

Referring to FIG. 5, the first ramp 240A is on the first track 216A and the second ramp 240B is on the second track 216B. Each of the first and second ramps 240A, 240B may include a raised flat surface 242, a first inclined or sloped surface 244, and a second inclined or sloped surface 246. The first sloped surface 244 may extend downwardly from the raised flat surface 242 toward the front 208 of the platform 204 and the second sloped surface 246 may extend downwardly from the raised flat surface 242 toward the rear 210 of the platform 204.

The dock 200 may rest on a cleaning surface S. Each of the ramps 240A, 240B (or each of the raised surfaces 242) may have a height H1 of between 7 mm and 10 mm relative to the cleaning surface S and, in some embodiments, have a height H1 of 8.5 mm relative to the cleaning surface S. Each of the charging contacts 222A, 222B may extend a distance H2 of between 14 mm and 18 mm above the cleaning surface S and, in some embodiments, extend a distance H2 of 16 mm above the cleaning surface S.

The left side portion 212 of the platform 204 and/or first track 216A may include a second flat surface 248A that extends from the second sloped surface 246 of the first ramp 240A toward the rear 210 of the platform 204. Similarly, the right side portion 214 of the platform 204 and/or the second track 216B may include a second flat surface 248B that extends from the second sloped surface 246 of the second ramp 240B toward the rear 210 of the platform 204.

The central portion 218 of the platform 204 may include a raised surface 252 and a first inclined or sloped surface 254 with the first sloped surface 254 extending downwardly from the raised surface 252 toward the front 208 of the platform 204. The raised surface 252 may be flat or substantially flat. The first and second charging contacts 222A, 212B are on the raised surface 252. Each of the charging contacts 222A, 222B may have a height H3 of between 2 mm and 5 mm relative to the raised surface 252 and, in some embodiments, have a height 113 of 3.7 mm relative to the raised surface 252. The raised surface 252 may be positioned vertically above the second sloped surfaces 246 of each of the first and second ramps 240A, 240B and/or the second flat surfaces 248A, 248B of each of the left and right side portions 212, 214 of the platform 204.

The central portion 218 of the platform 204 may include a second inclined or sloped surface 256 and a second flat surface 258. The second sloped surface 256 extends downwardly from the raised surface 252 to the second flat surface 258. The second flat surface 258 extends from the second sloped surface 256 toward the rear 210 of the platform 204.

Figure 6:
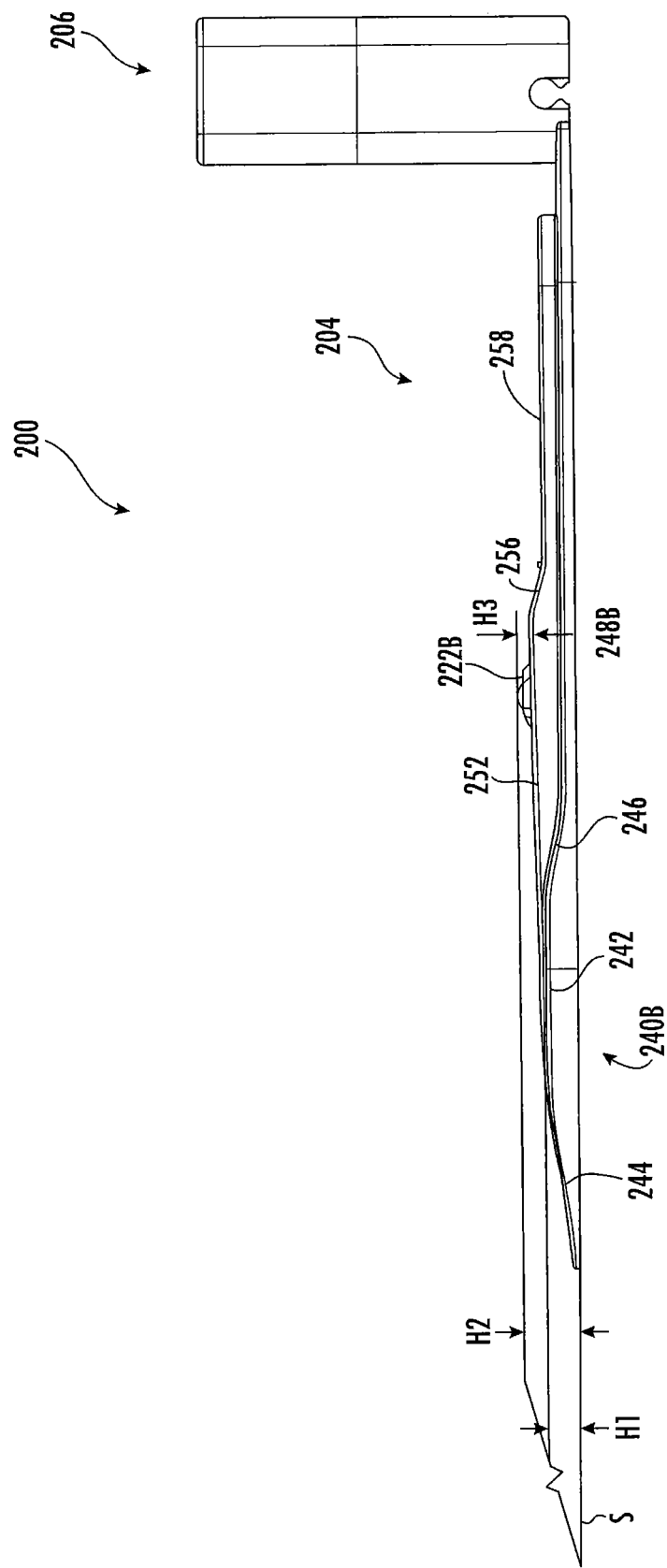
FIG. 6 is a side view of the dock of FIG. 5.
Figure 9:
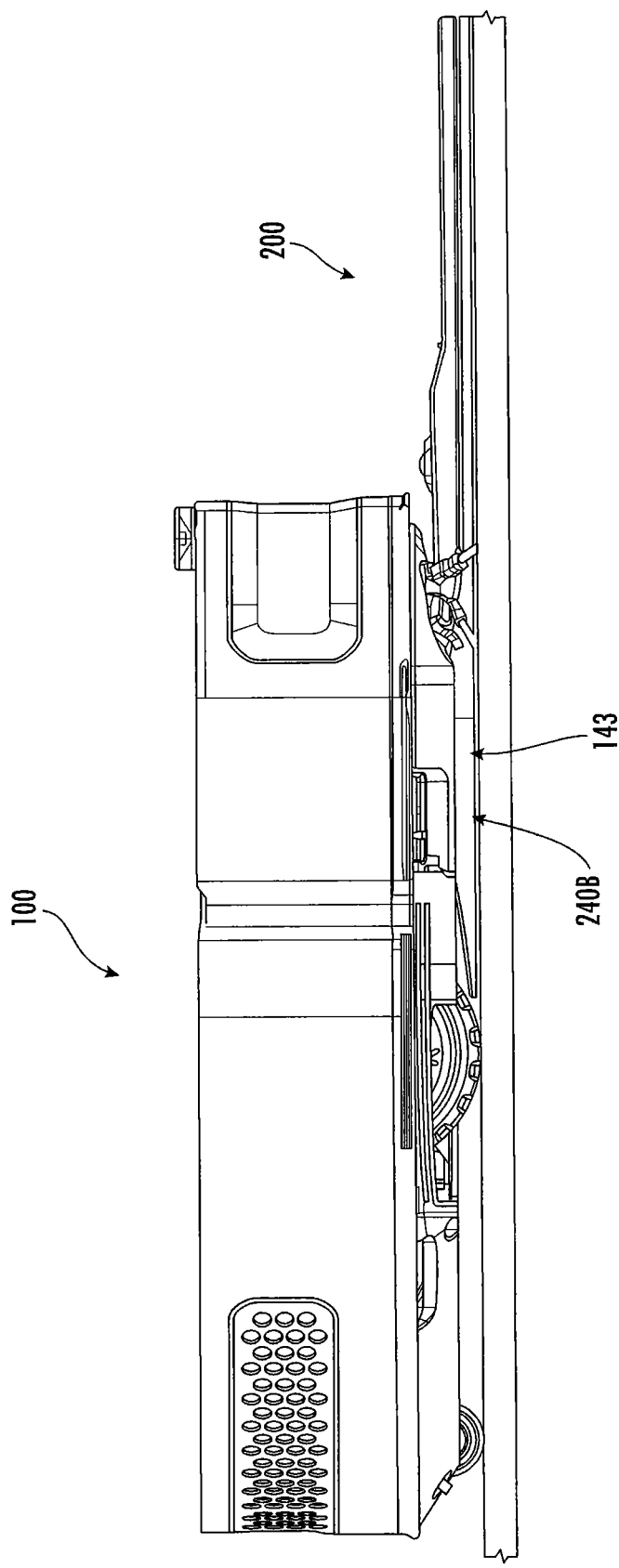
Figure 11:
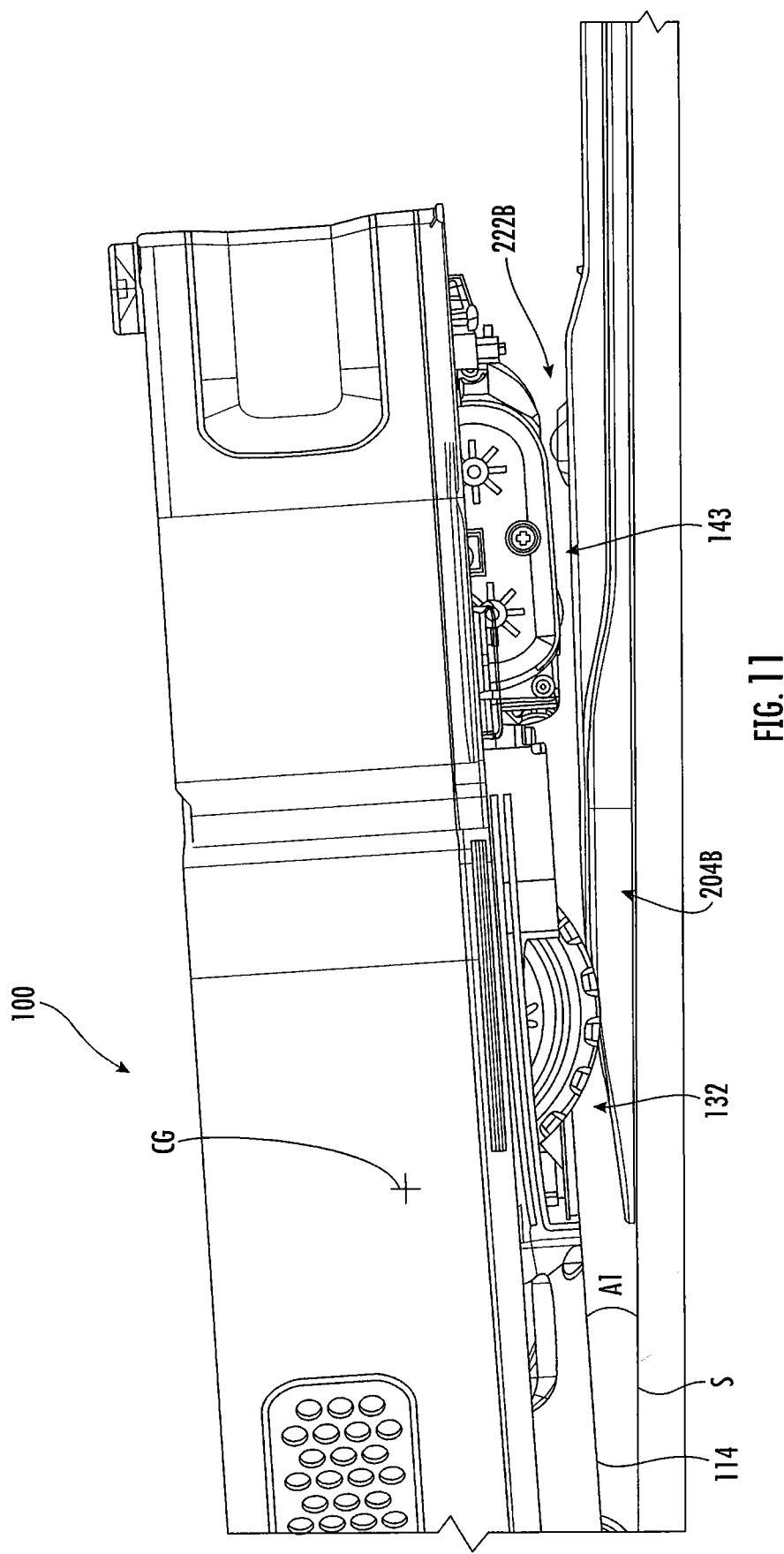
Figure 12:
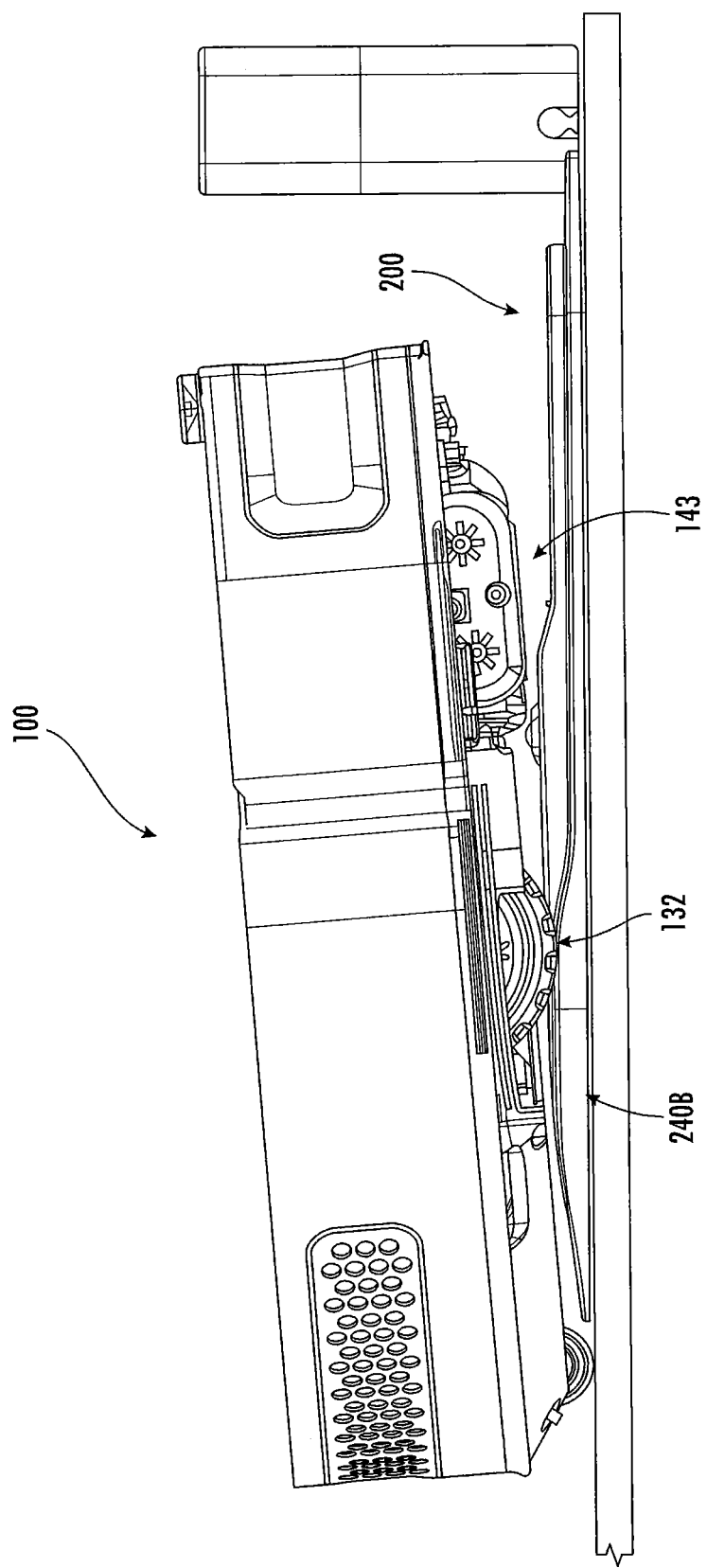
Figure 13:
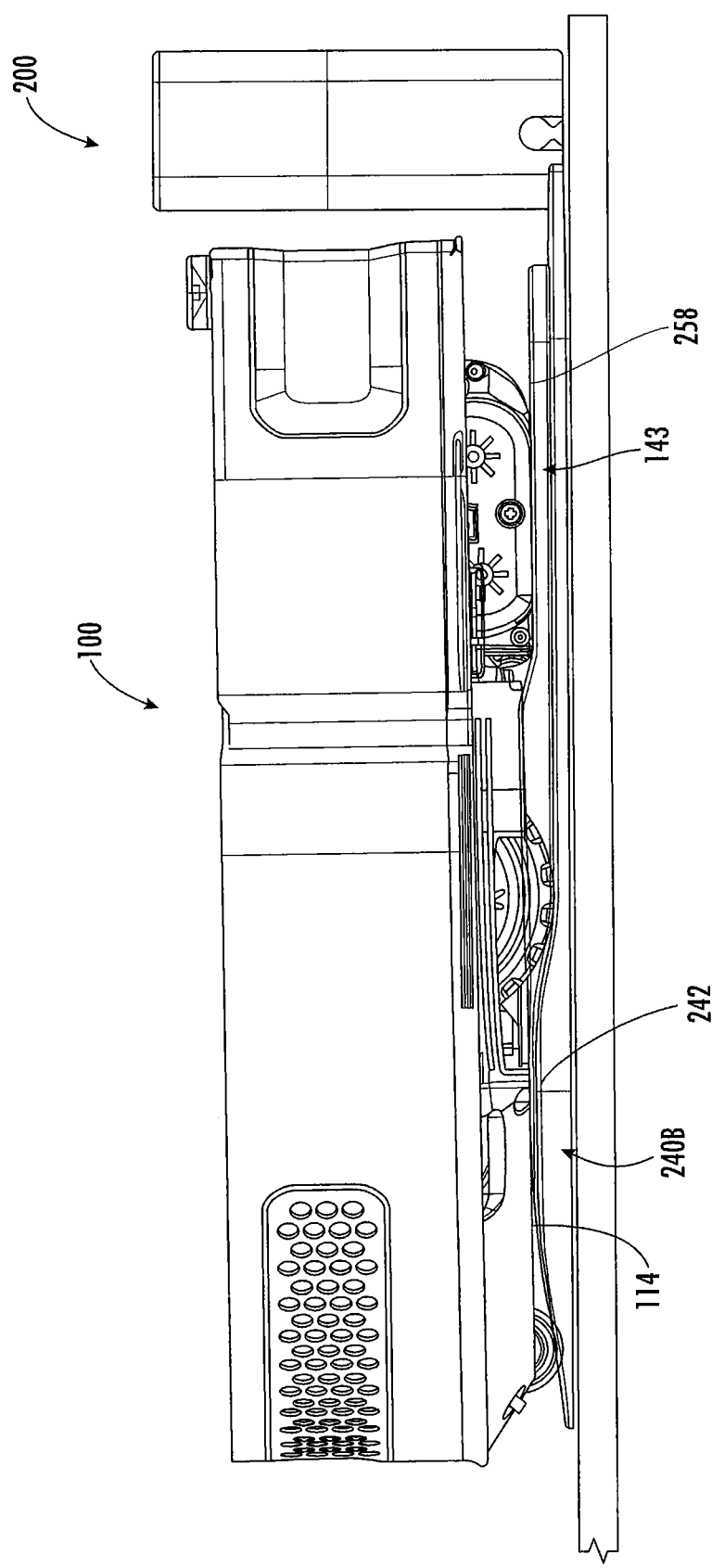

FIGS. 8 to 13 illustrate the robot 100 sequentially moving from the approach position (FIG. 8) to the docked position (FIG. 13). With reference to FIGS. 5, 6, and 9, as the robot 100 approaches the dock 200, the cleaning module 143 in the front portion of the robot 100 engages and rides up and along the first sloped surface 244 of the ramps 240A, 240B and then engages and rides along the raised surface 242 of the ramps 240A, 240B.

Figure 10:
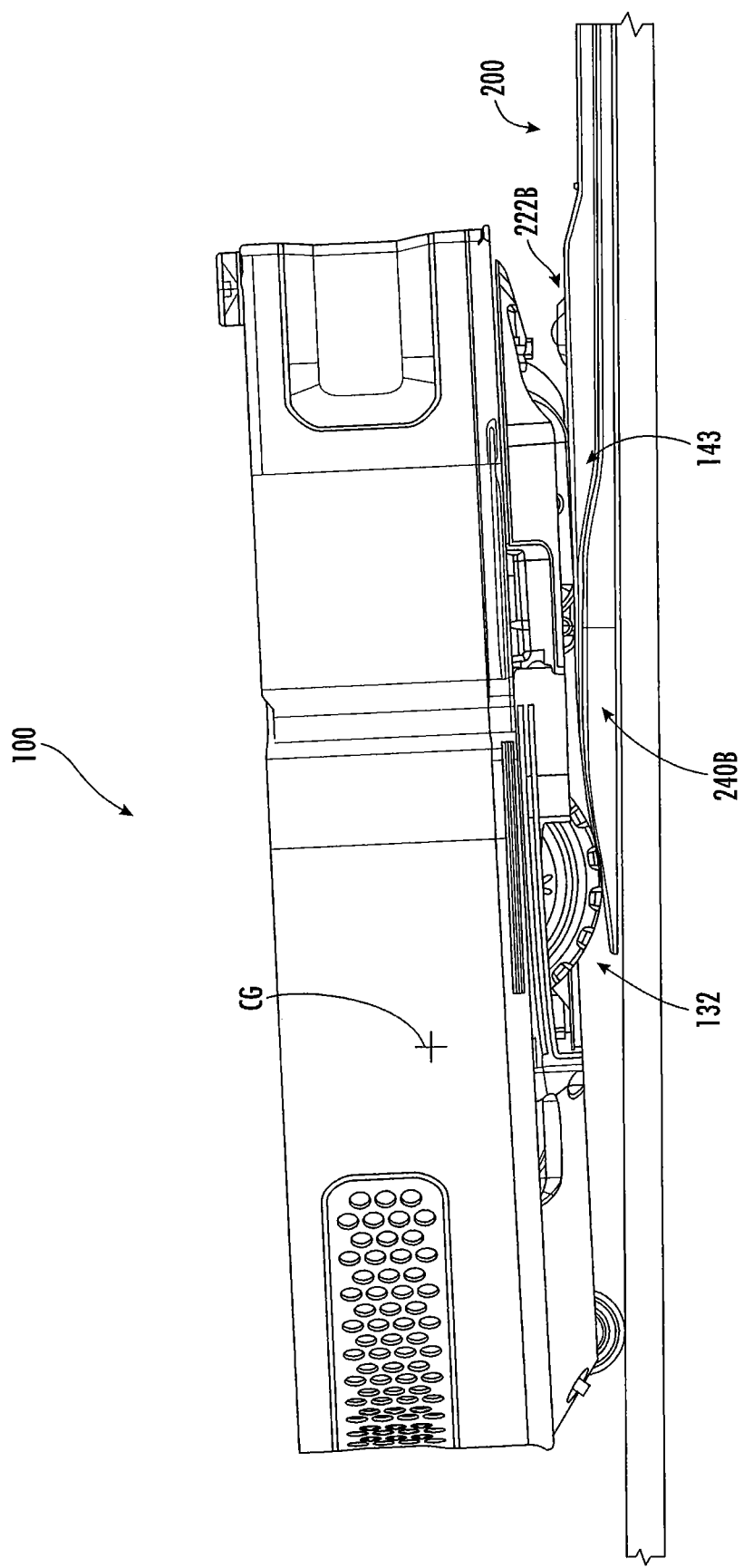

With reference to FIGS. 5, 6, and 10, the wheels 132 of the robot 100 roll up the first sloped surfaces 244 of the ramps 240A, 240B and, in response, the cleaning module 143 rises upward (e.g., off the platform 204) as it approaches the dock charging contacts 222A, 222B. With reference to FIGS. 5, 6, and 11, as the wheels 132 roll to the raised surfaces 242 of the ramps 240A, 240B, the cleaning module 143 rises further upward and is positioned vertically above the dock charging contacts 222A, 222B.

Referring to FIG. 11, the robot 100 has a tilt angle A1 relative to horizontal due to engagement with the ramps 240A, 240B. The tilt angle A1 may be measured between the bottom 114 of the housing and the cleaning surface S. The tilt angle A1 may be between 6 degrees and 11 degrees and, in some embodiments, is about 8.5 degrees.

With reference to FIGS. 5, 6, and 12, as the wheels 132 roll along the raised surfaces 242 of the ramps 240A, 240B, the cleaning module 143 remains raised above the dock charging contacts 222A, 222B and passes over the dock charging contacts 222A, 222B. The center of gravity CG of the robot 100 may be behind the wheels 132 to facilitate the aforementioned actions.

With reference to FIGS. 5, 6, and 13, as the wheels 132 reach and roll down the second sloped surfaces 246 of the ramps 240A, 240B, the cleaning module 143 has passed or substantially passed the dock charging contacts 222A, 222B and the cleaning module 143 and the robot 100 descend into the docked position. In the docked position, the robot charging contacts 164A, 164B (FIG. 3) engage the dock charging contacts 222A, 222B (FIG. 5).

In the docked position, the bottom 114 of the robot housing may be spaced apart from the raised flat surfaces 242 of the first and second ramps 240A, 240B. This may reduce wear on the bottom of the robot 100 as it enters and exits the dock 200.

In the docked position, the left wheel 132 of the robot 100 may be on the second sloped surface 246 of the ramp 240A and/or the second flat surface of the 248A of the left side 212 of the dock platform 204. In the docked position, the right wheel 132 may be on the second sloped surface 246 of the ramp 240B and/or the second flat surface of the 248B of the right side 214 of the dock platform 204. In the docked position, the cleaning module 143 of the robot 100 may be on the second flat surface 258 of the central portion 218 of the dock platform 214.

When the robot is deployed from the docked position, the ramps 240A, 240B cause the robot and its components to move in the reverse of the above-described motion. Thus, when the robot 100 is deployed, the cleaning module 143 is raised above the dock charging contacts 222A, 222B as the wheels 132 engage the ramps 240A, 240B.

The cleaning module 143 is located at the front of the robot 100 and at ground level, and therefore has the potential to scrape against the dock charging contacts 222A, 222B as the robot 100 approaches its charging or docked position, thereby posing a risk to the longevity of the charging contacts 222A, 222B. The present inventors addressed this problem by including the ramps 240A, 240B on the dock platform 204 such that the cleaning module 143 is lifted up and over the charging contacts 222A, 222B as described above.

Figure 14:
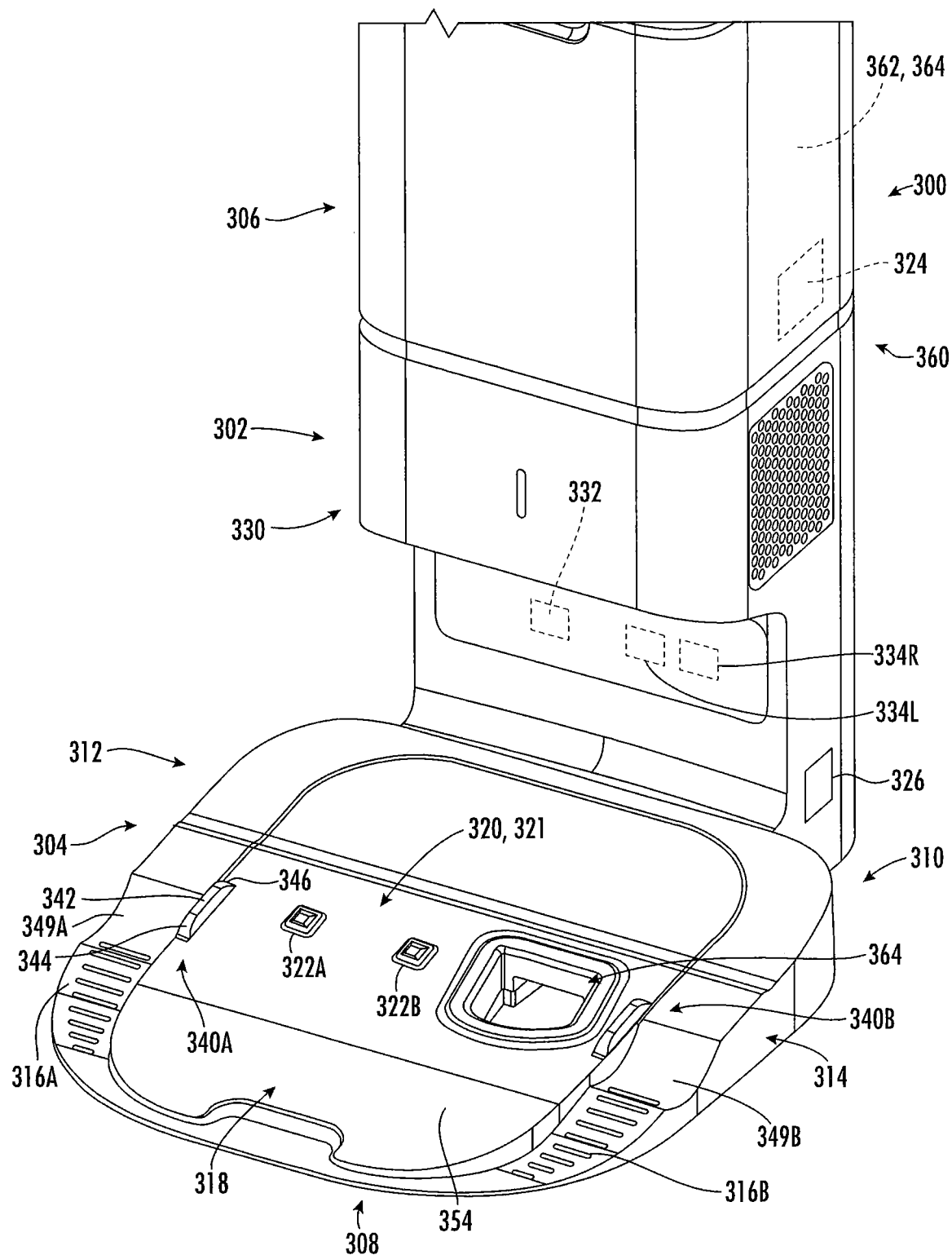
FIG. 14 is a fragmentary perspective view of an evacuation dock according to embodiments of the invention.
Figure 15:
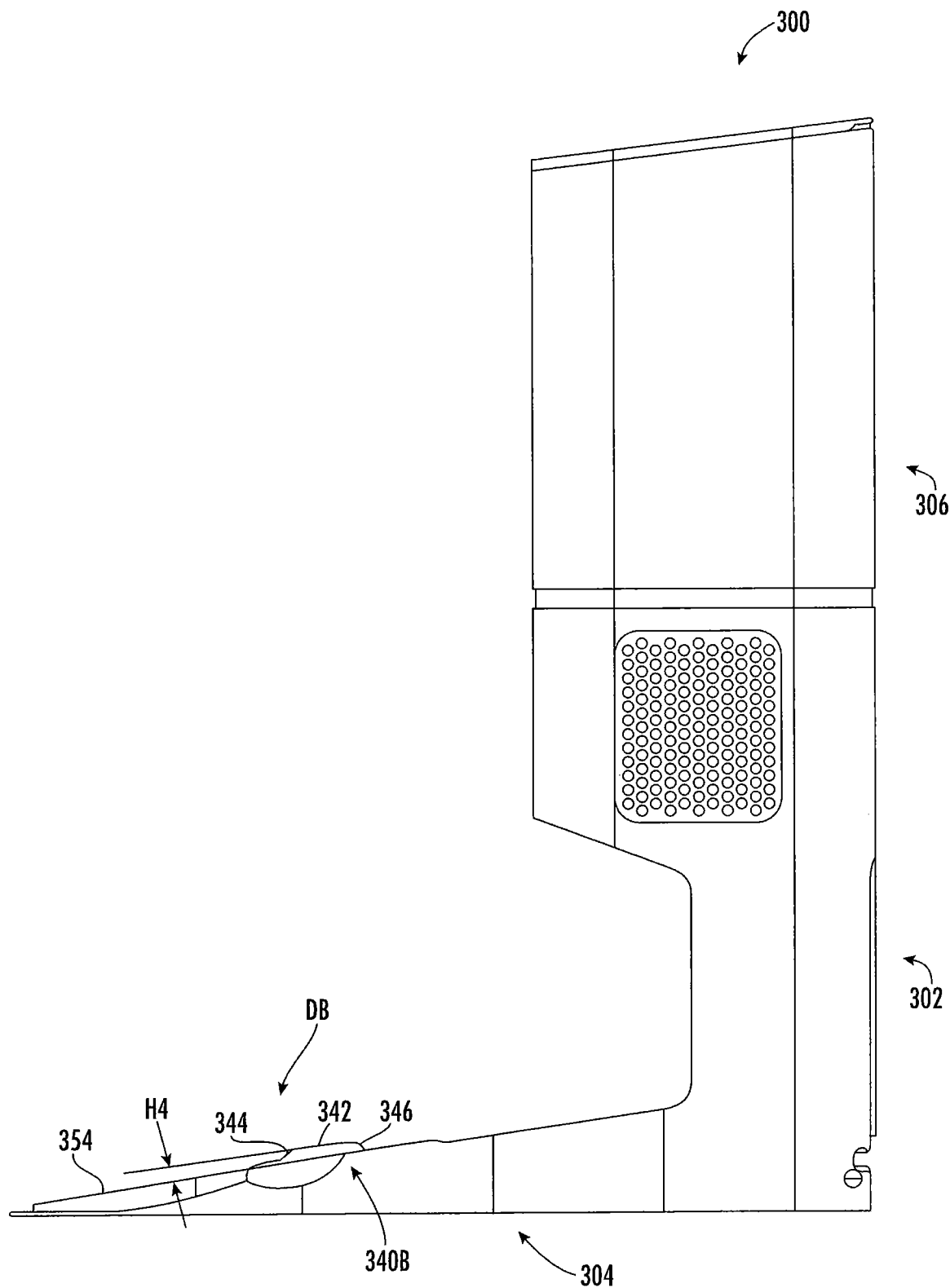
FIG. 15 is a side view of the evacuation dock of FIG. 14.

FIGS. 14 and 15 show an evacuation dock 300 in accordance with one embodiment of the invention. The evacuation dock 300 includes a housing 302 including both a substantially horizontal base plate or platform 304 and a substantially vertical tower or backstop 306. A docking bay DB is defined over the platform 304 and in front of the backstop 306. The evacuation dock 300 may be any of a variety of shapes or sizes, providing sufficient space for the desired components and systems, described below.

The platform 304 includes a front 308 and a rear 310 with the tower 306 at the rear 310 of the platform 304. The platform 304 includes a left side portion 312 and a right side portion 314. A first or left track 316A is on the left side portion 312 of the platform 304 and a second or right track 316B is on the right side portion 314 of the platform 304. The platform 304 includes a central portion 318 between the left and right side portions 312, 314.

An evacuation suction port 364 is defined in the central portion 318. The evacuation suction port 364 is offset from the lateral centerline of the platform 310 and the midpoint between the tracks 316A, 316B.

The platform 304 may be sloped at an upwards angle toward the backstop 320.

The evacuation dock 300 includes a charging subsystem 320, a communications/guidance system 330, a dock controller 324, and a power input connector 326 (connected to a power supply, not shown) corresponding to and operative in the same manner as the charging subsystem 220, the communications/guidance system 230, the dock controller 224, and the power input connector 226, respectively, except as discussed below. The evacuation dock 300 may include an avoidance emitter 332 and directional emitters 334R, 334L corresponding to the avoidance emitter 232 and the directional emitters 234R, 234L, respectively.

The charging subsystem 320 includes a charging circuit 321, which includes first and second charging contacts 322A, 322B on the central portion 318 of the platform 304. Like the charging contacts 222A, 222B, the charging contacts 322A, 322B are configured to engage the charging contacts 164A, 164B of the robot 100 (FIG. 3) when the robot 100 is in a docked position on the dock 300. The charging contacts 322A, 322B may be spring loaded.

The evacuation dock 300 further includes a debris evacuation system 360. The evacuation system 360 includes a debris bin 362 (which may be removable) in the tower 306, an evacuation port 364 located in the platform 304, a duct or ducts fluidly connecting the port 364 to the bin 362, and a suction fan 364 configured to draw debris from the evacuation port 364 and into the bin 362.

The wheel tracks 316A, 316B are designed to receive the robot's drive wheels 132 to guide the robot 100 onto the platform 304 in proper alignment with the evacuation suction port 364. The wheel tracks 316A, 316B includes depressed wheel wells 349A, 349B, respectively, that each hold a drive wheel 132 in place to positively align and locate the robot 100 relative to the platform 304, and to prevent the robot 100 from unintentionally sliding down the inclined platform 304 once docked.

The robot 100 can dock with the evacuation dock 300 by advancing onto the platform 304 and into the docking bay DB of the evacuation dock 300 as described above with regard to the dock 200. Once the evacuation dock 300 receives the robot 100, the suction fan 364 generates a vacuum that draws debris from the cleaning bin 145 of the robot 100, through the platform 304, and into the debris bin 362.

When the robot 100 is docked in the prescribed docked position in the docking bay DB, the robot charging contacts 164A, 164B are vertically aligned with and engage the dock charging contacts 322A, 322B. Additionally, the evacuation part 120 of the robot 100 will be aligned with and in contact with or in close proximity to the evacuation port 364 of the evacuation dock 300.

The robot 100 can avoid, discover, and approach the evacuation dock 300 in the same manner as described above with regard to the dock 200. The robot may rely on the wheel wells 349A, 349B to capture the wheels 132, thereby positively aligning and positioning the robots and ensuring that the robot is properly aligned in the final portion of the docking approach.

Figure 16:
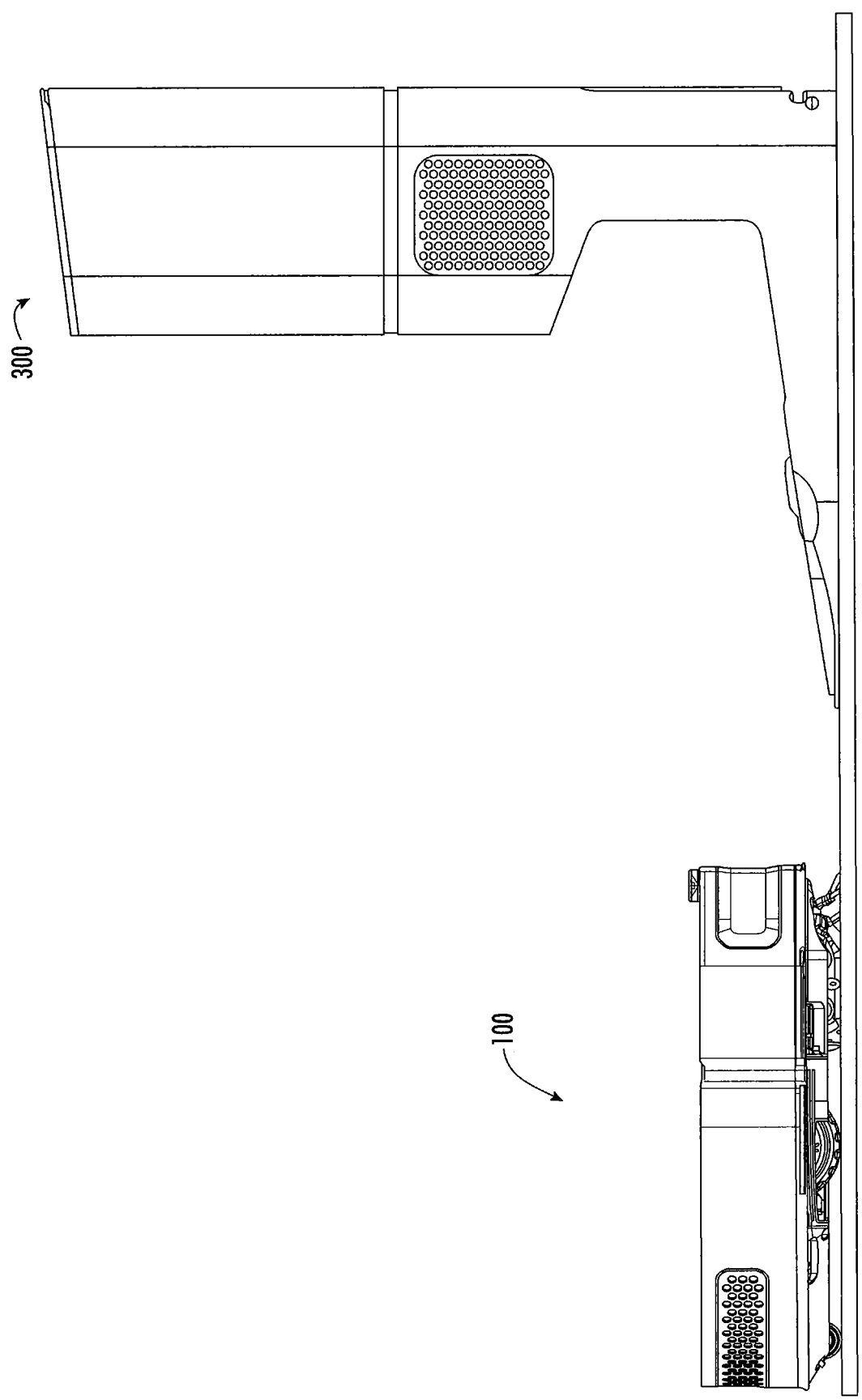
FIGS. 16-21 are sequential side views of a robot of the system of FIG. 1 advancing from an approach position to docked position on the evacuation dock of FIG. 14.

Referring to FIGS. 14 and 15, the platform 306 includes first and second ramp features such as first and second ribs 340A, 340B. The robot 100 is movable between an approach position with the robot 100 spaced apart from the platform 306 (FIG. 16) and a docked position (FIG. 21) with the robot 100 on the platform 306 and the docking station charging contacts 322A, 322B engaged with the robot charging contacts 164A, 164B. As described in more detail below, the first and second ramp features are positioned and configured such that, as the robot 100 moves from the approach position to the docked position, the robot 100 engages the ramp features and the cleaning module 143 of the robot is lifted over the docking station charging contacts 322A, 322B. The ramp features therefore help prevent the robot from damaging the docking station charging contacts as the robot drives onto the docking station platform by raising the cleaning module up and over the docking station charging contacts.

Referring to FIG. 14, the first rib 340A is on the central portion 318 of the platform 304 or at an interface between the left side portion 312 of the platform 304 and the central portion 318 of the platform 304. The second rib 340A is on the central portion 318 of the platform 304 or at an interface between the right side portion 314 of the platform 304 and the central portion 318 of the platform 304. Each of the first and second ribs 340A, 340B may include a raised flat surface 342, a first inclined or sloped surface 344, and a second inclined or sloped surface 346. The first sloped surface 344 may extend downwardly from the raised flat surface 342 toward the front 308 of the platform 304 and the second sloped surface 346 may extend downwardly from the raised flat surface 342 toward the rear 310 of the platform 304.

Each of the ribs 340A, 340B may be on an inclined or sloped surface 354 of the platform 304. Referring to FIG. 15, each of the ribs 340A, 340B may have a height 114 of between 3 mm and 8 mm relative to the sloped surface 354 and, in some embodiments, have a height 114 of 5.5 mm relative to the sloped surface 354. The charging contacts 322A, 322B may protrude above the sloped surface 354 the same distance or about the same distance as the charging contacts 222A, 222B protrude above the raised surface 252 (FIG. 5).

Figure 17:
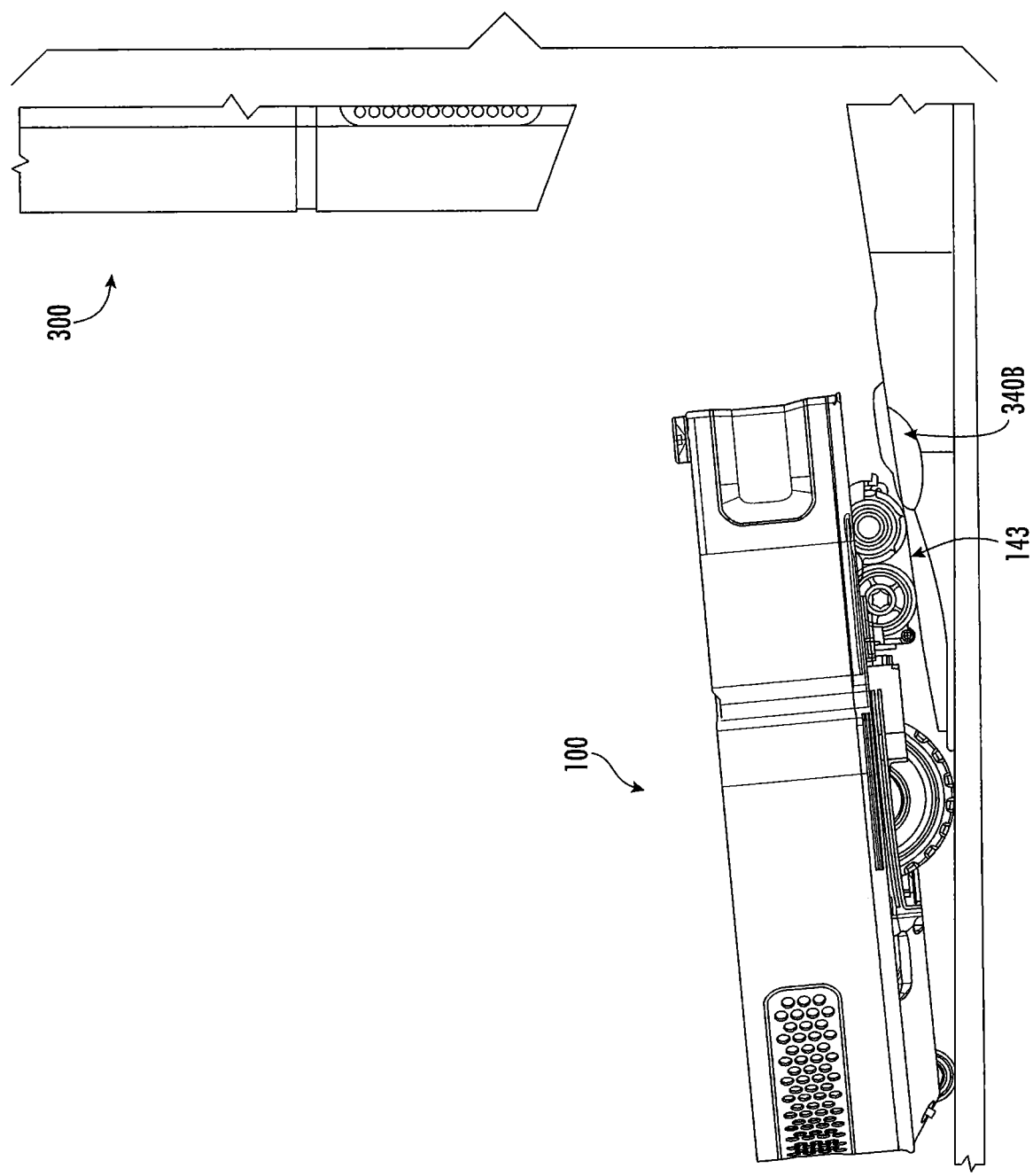
Figure 18:
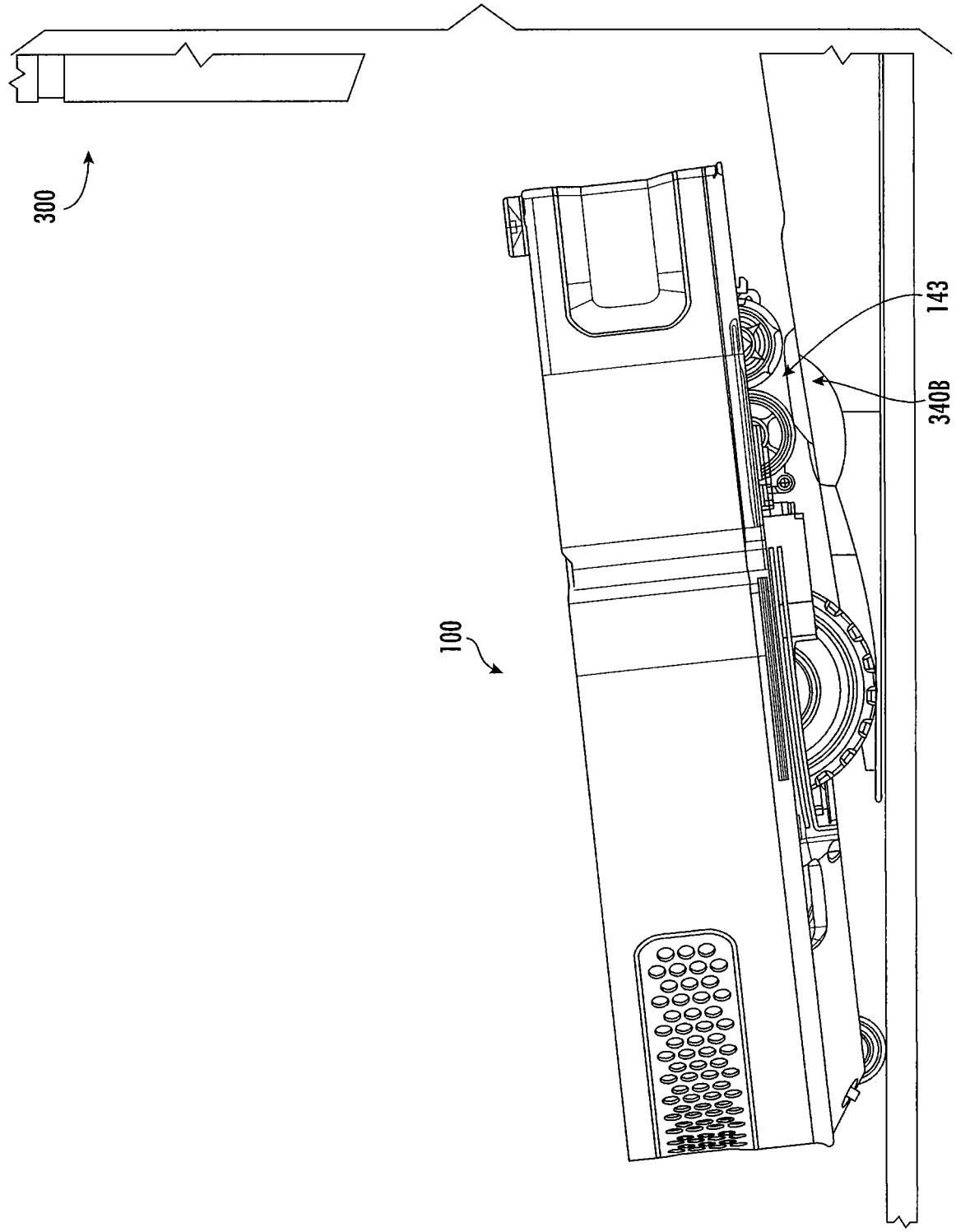
Figure 19:
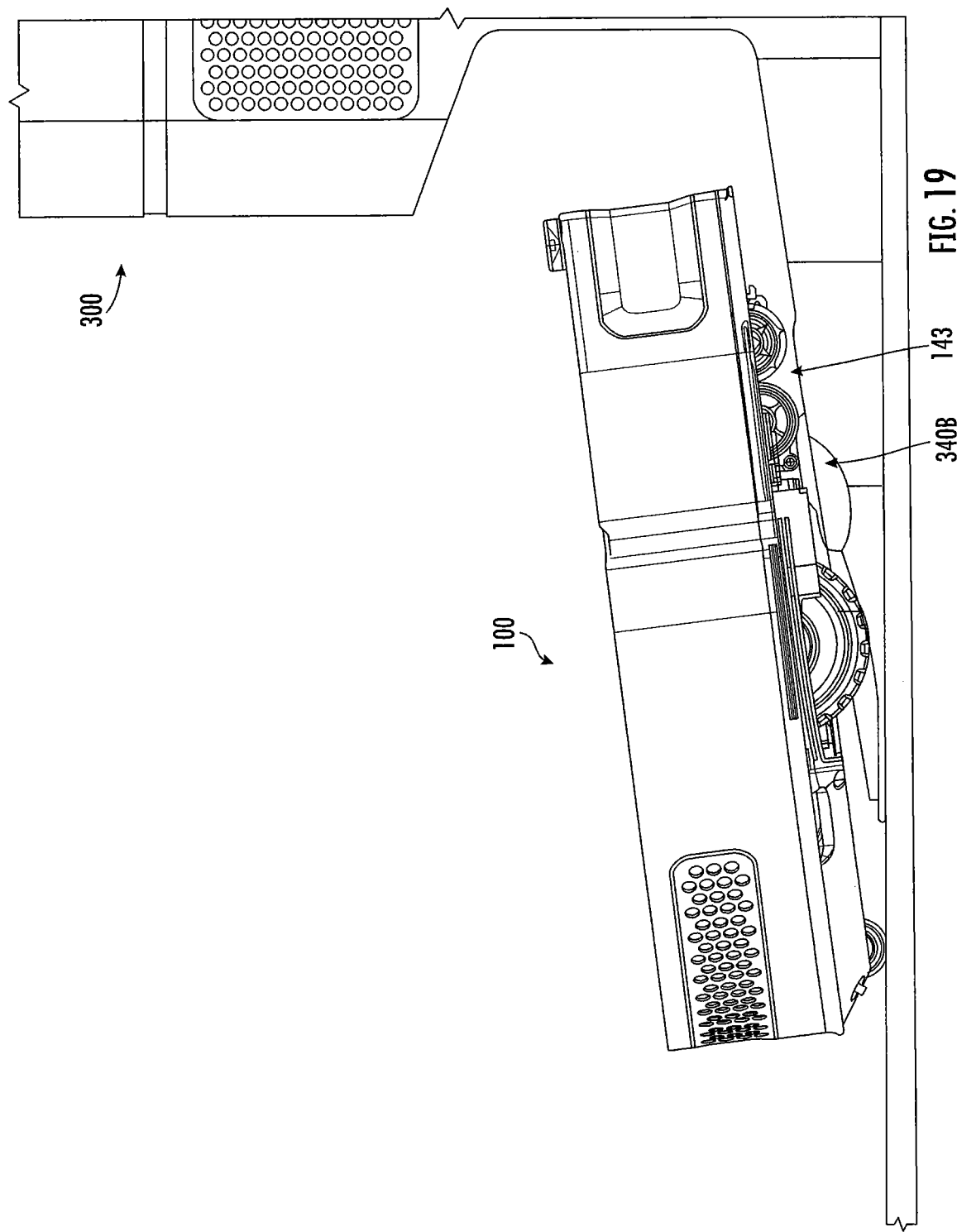
Figure 20:
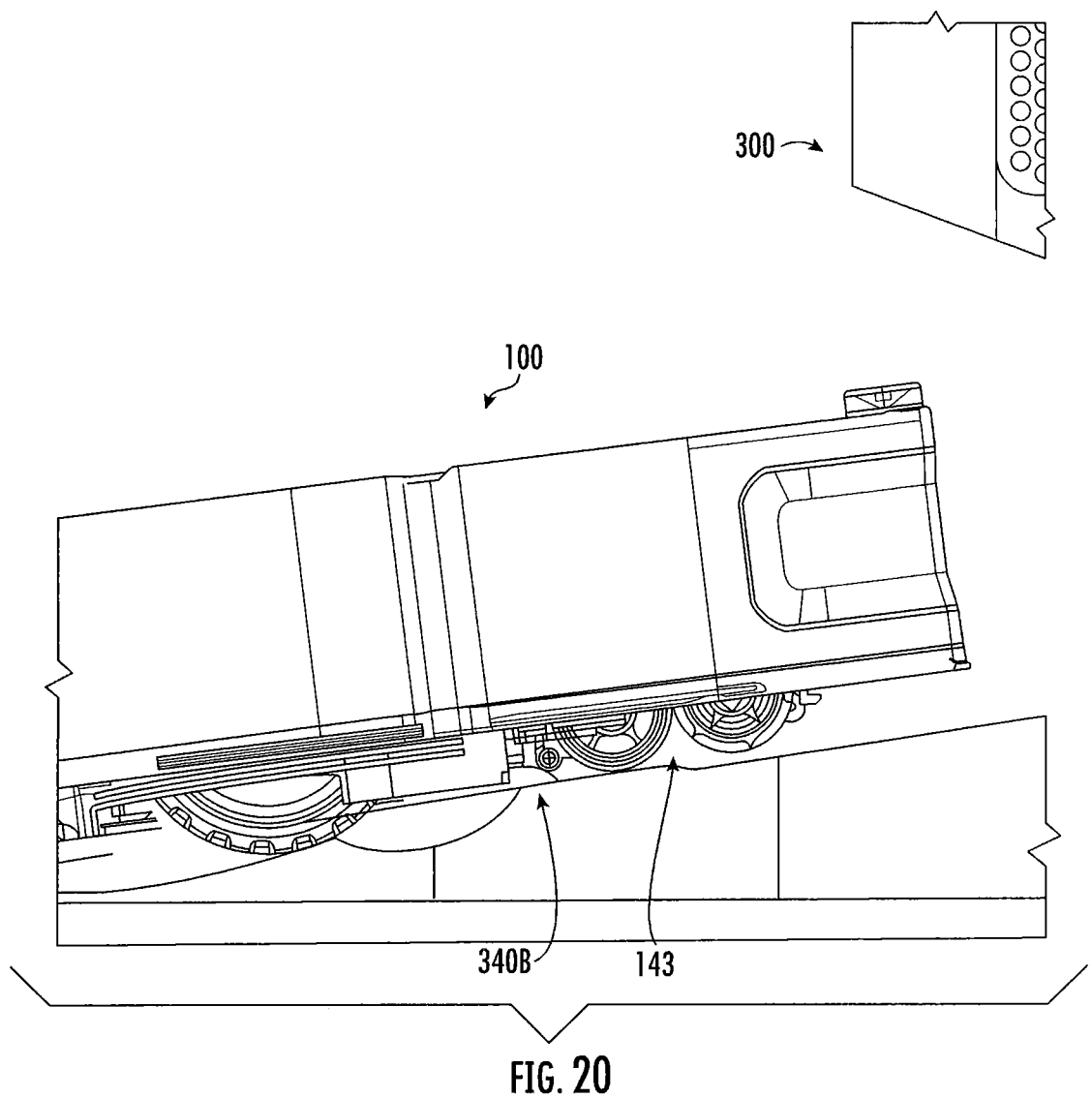
Figure 21:
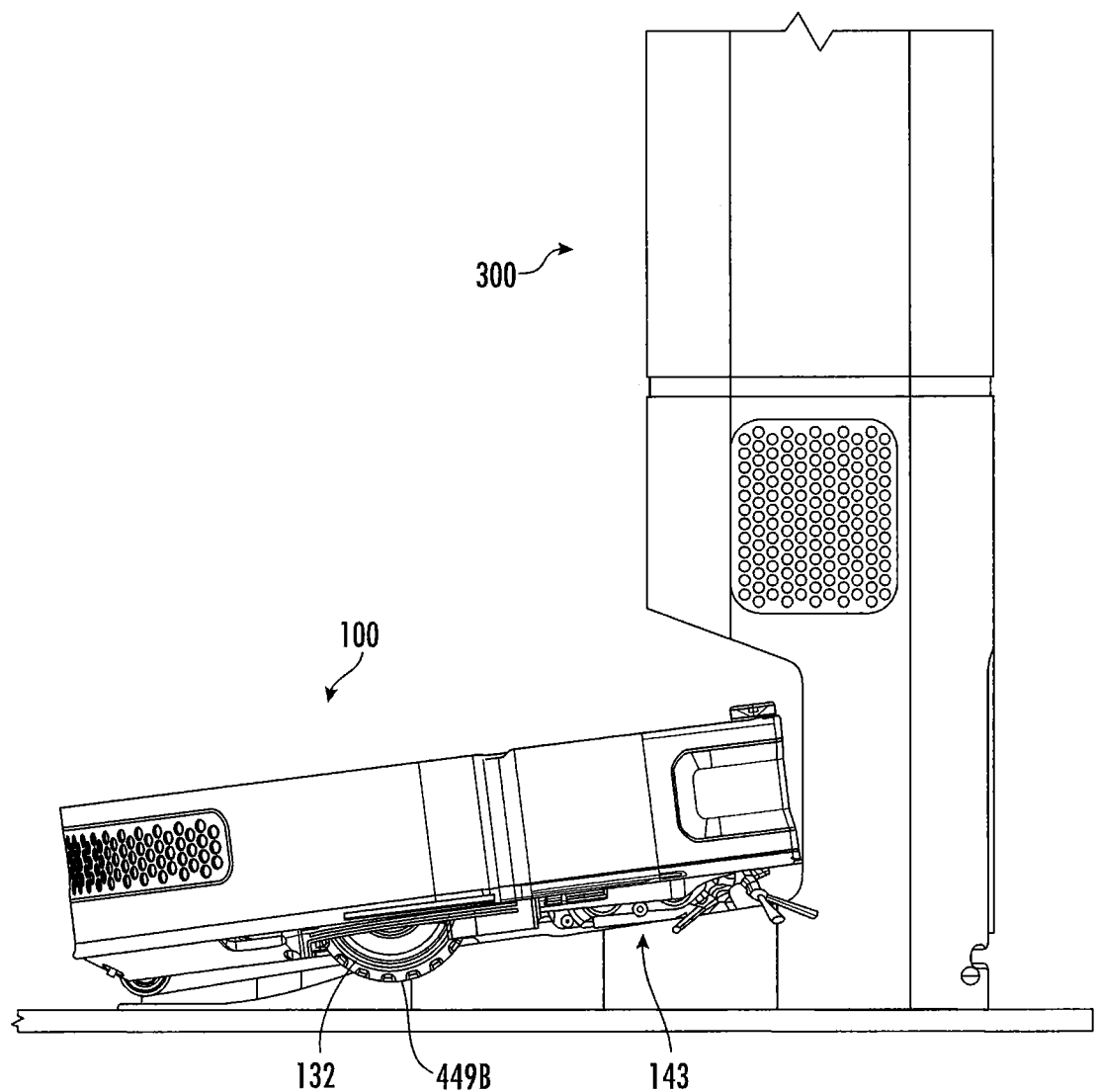

FIGS. 16 to 21 illustrate the robot 100 sequentially moving from the approach position (FIG. 16) to the docked position (FIG. 21). With reference to FIGS. 14, 15 and 17, as the wheels 132 of the robot 100 first make contact with the dock platform 304, the cleaning module 143 in the front portion of the robot 100 engages and then rides up and along the first sloped surface 344 of the ribs 340A, 340B to raise the cleaning module 143 upward over the platform 304. With reference to FIGS. 14, 15, 18 and 19, as the robot 100 continues to drive up the dock 300, the cleaning module 143 engages and rides along the raised surfaces 342 of the ribs 340A, 340B. This keeps the cleaning module 143 raised above the charging contacts 322A, 322B as the cleaning module 143 passes the charging contacts 322A, 322B.

With reference to FIGS. 14, 15, 20 and 21, after the cleaning module 143 has passed the charging contacts 322A, 322B, the cleaning module 143 rides down the second sloped surfaces 346 of the ribs 340A, 340B. As a result, the robot 100 including the cleaning module 143 descends onto the dock platform 304. In the docked position shown in FIG. 21, the dock charging contacts 322A, 322B engage the robot charging contacts 164A, 164B. In the docked position, the robot wheels 132 are held in the wheel wells 149A, 149B.

Figure 3:
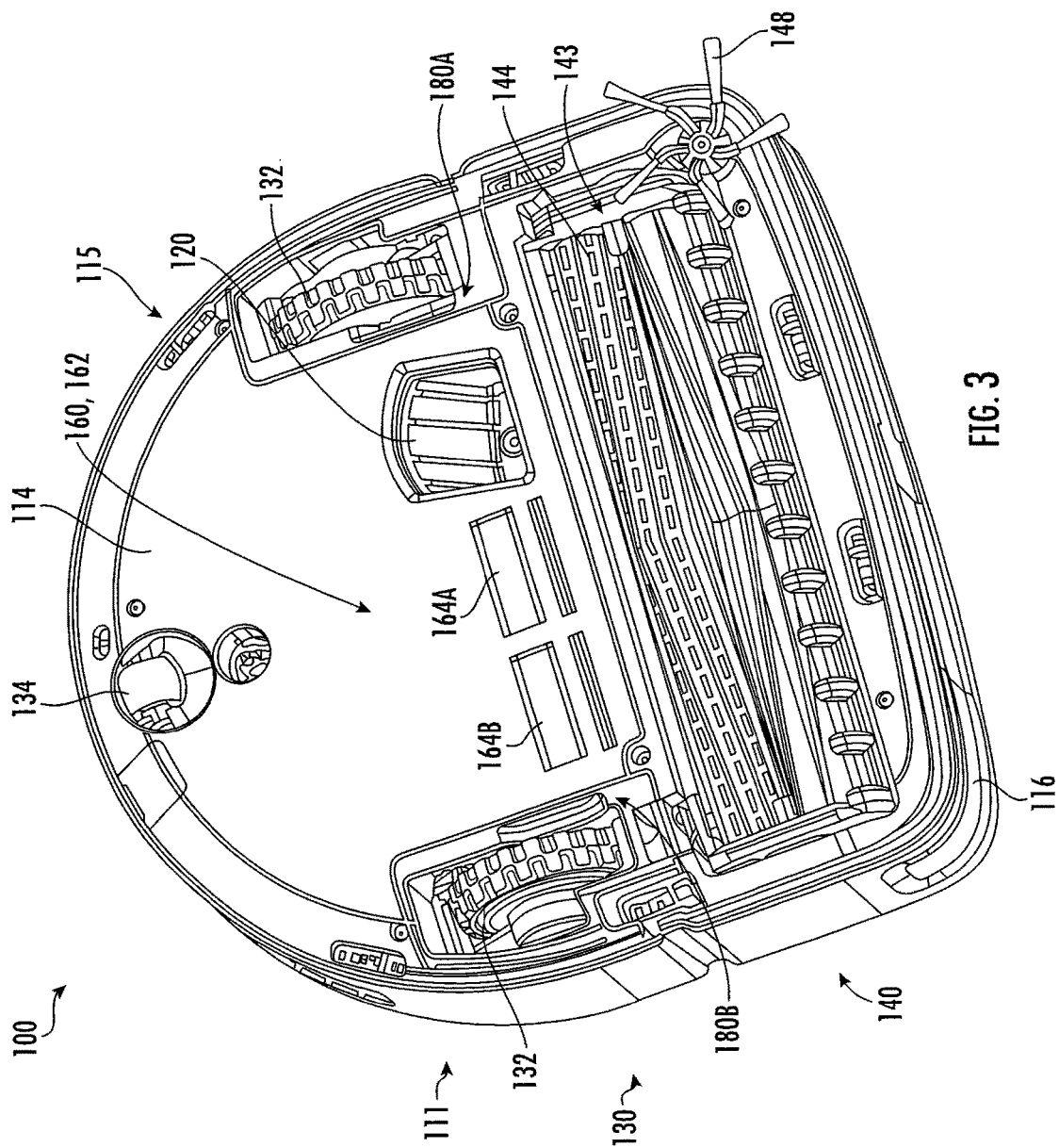
FIG. 3 is a bottom perspective view of the robot of FIG. 2.

Referring to FIG. 3, first and second recesses or pockets 180A, 180B are formed in the bottom 114 of the robot housing. The first pocket 180A is sized and positioned to receive the first rib 140A and the second pocket 180B is sized and positioned to receive the second rib 140B when the robot is in the docked position. The first pocket 180A may be adjacent the left robot wheel 132 and the second pocket 180B may be adjacent the right robot wheel 132.

When the robot is deployed from the docked position, the ribs 340A, 340B cause the robot and its components to move in the reverse of the above-described motion. Thus, when the robot 100 is deployed, the cleaning module 143 is raised above the dock charging contacts 322A, 322B as the cleaning module 143 engage the ribs 340A, 340B.

The cleaning module 143 is located at the front of the robot 100 and at ground level, and therefore has the potential to scrape against the dock charging contacts 322A, 322B as the robot 100 approaches its charging or docked position, thereby posing a risk to the longevity of the charging contacts 322A, 222B. The present inventors addressed this problem by including the ribs 340A, 340B on the dock platform 304 such that the cleaning module 143 is lifted up and over the charging contacts 322A, 322B as described above.

The foregoing is illustrative of the present invention and is not to be construed as limiting thereof Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A mobile robot system comprising: a docking station comprising: a platform having a front and a rear; first and second raised charging contacts on the platform; and first and second ramp features on the platform; and a mobile robot comprising: a housing; a motorized drive system connected to the housing and including first and second drive wheels; first and second charging contacts on a bottom of the housing; and a cleaning module comprising at least one rotatable cleaning head that extends below the bottom of the housing; wherein the mobile robot is movable from an approach position with the mobile robot spaced apart from the front of the platform to a docked position with the mobile robot on the platform and the docking station charging contacts engaged with the mobile robot charging contacts; wherein, as the mobile robot moves from the approach position to the docked position, the mobile robot engages the first and second ramp features and the cleaning head is lifted over and past the docking station charging contacts.

2. The system of claim 1 wherein as the mobile robot moves from the approach position to the docked position, the first drive wheel engages the first ramp feature and the second drive wheel engages the second ramp feature.

3. The system of claim 1 wherein:
the platform comprises a first track on a left side portionof the platform and a second track on a right side portion of the platform;
the first ramp feature comprises a first ramp on the first track; and
the second ramp feature comprises a second ramp on the second track.

4. The system of claim 3 wherein each of the first and second ramps is positioned closer to the front of the platform than the rear of the platform.

5. The system of claim 3 wherein each of the first and second ramps comprises a raised flat surface, a first sloped surface, and a second sloped surface with the first sloped surface extending from the raised flat surface downwardly toward the front of the platform and the second sloped surface extending downwardly from the raised flat surface toward the rear of the platform.

6. The system of claim 5 wherein the bottom of the housing is spaced apart from the raised flat surfaces of each of the first and second ramps when the mobile robot is in the docked position.

7. The system of claim 5 wherein:
the left side ortion of the platform includes a second flat surface extending from the second sloped surface to the rear of the platform; and
the right side portion of the platform includes a second flat surface extending from the second sloped surface to the rear of the platform.

8. The system of claim 7 wherein:
the platform includes a central portion between the left an lit side portions;

the central portion includes a raised surface and a first sloped surface with the first sloped surface extending downwardly from the raised surface toward the front of the platform;

the docking station first and second charging contacts are on the raised surface of the central portion of the platform; and the raised surface of the central portion of the platform is positioned vertically above the second sloped surfaces of each of the first and second ramps and/or the second flat surfaces of each of the left and right side portions of the platform.

9. The system of claim 8 wherein the central portion of the platform includes a second sloped surface and a second flat surface with the second sloped surface extending downwardly from the raised surface to the second flat surface and the second flat surface extending from the second sloped surface toward the rear of the platform.

10. The system of claim 9 wherein, in the clocked position:

the left wheel is on the second sloped surface of the first ramp and/or the second flat surface of the left side portion of the platform;

the right wheel is on the second sloped surface of the second ramp and/or the second flat surface of the right side portion of the platform; and the cleaning module is on or over the second flat surface of the central portion of the platform.

11. The system of claim 1 wherein as the mobile robot moves from the approach position to the docked position, the cleaning module engages each of the first and second ramp features.

12. The system of claim 11 wherein the first and second ramp features comprise first and second ribs, respectively, that each protrude upwardly from the platform.

13. The system of claim 12 wherein each of the first and second ribs comprise a raised flat surface, a first sloped surface, and a second sloped surface with the first sloped surface extending from the raised flat surface downwardly toward the front of the platform and the second sloped surface extending downwardly from the raised flat surface toward the rear of the platform.

14. The system of claim wherein:

the platform comprises a first track on a left side portion of the platform and a second track on a right side portion of the platform;

the first rib is between the first charging contact of the docking station and the first track; and the second rib is between the second charging contact of the docking station and the second track.

15. The system of claim 14 wherein:

a first depressed wheel well is defined in the first track and a second depressed wheel is defined in the second track; and in the docked position, the first wheel is received in the first depressed wheel well and second wheel is received in the second depressed wheel well.

16. The system of claim 15 wherein the first recessed pocket is adjacent the first wheel and the second recessed pocket is adjacent the second wheel.

17. The system of claim 1 wherein:

the mobile robot comprises first and second recessed pockets in the bottom of the housing; and in the docked position, the first rib is received in the first recessed pocket and the second rib is received in the second recessed pocket.

18. A method for docking a mobile cleaning robot with a docking station, the method comprising:

advancing the mobile cleaning robot onto a platform of the docking station;

while advancing the mobile cleaning robot onto the platform of the docking station, lifting a a roller of the cleaning head, that extends below a bottom of a housing of the robot, above at least one charging contact on the platform by advancing the robot over at least one elongated ramp feature on the platform and passing the roller over and past the at least one charging contact; and docking the robot in a docked position on the platform with at least one charging contact on the bottom of the housing of the robot engaging the at least one charging contact on the platform and with the cleaning mechanism positioned between the at least one charging contact on the platform and a rear of the platform.

19. The method of claim 18, wherein the platform comprises a first track on a left side portion of the platform and a second track on a right side portion of the platform, the first ramp feature comprises a first ramp on the first track, and the platform includes a second ramp feature that comprises a second ramp on the second track.

20. The method of claim 19, wherein each of the first and second ramps comprises a raised flat surface, a first sloped surface, and a second sloped surface with the first sloped surface extending from the raised flat surface downwardly toward the front of the platform and the second sloped surface extending downwardly from the raised flat surface toward the rear of the platform.

* * * * *

UNITED STATES PATENT AND TRADEMARK OFFICE
CERTIFICATE OF CORRECTION

PATENT NO. : 10,737,395 B2  
APPLICATION NO. : 15/858550  
DATED : August 11, 2020  
INVENTOR(S) : Wolff et al.

Page 1 of 1

It is certified that error appears in the above-identified patent and that said Letters Patent is hereby corrected as shown below:

In the Claims

In Column 18, Line 37, in Claim 3, delete "portionof" and insert --portion of-- therefor In Column 18, Line 50, in Claim 5, delete "fiat" and insert --flat-- therefor In Column 18, Line 59, in Claim 7, delete "ortion" and insert --portion-- therefor In Column 18, Lines 66-67, in Claim 8, delete "an lit" and insert --and right-- therefor In Column 19, Line 19, in Claim 10, delete "clocked" and insert --docked-- therefor In Column 19, Line 43, in Claim 14, delete "claim" and insert --claim 12-- therefor In Column 20, Line 3, in Claim 15, after "wheel", insert --well--

In Column 20, Line 6, in Claim 15, after "and", insert --the--

In Column 20, Line 11, in Claim 17, delete "claim 1" and insert --claim 12-- therefor In Column 20, Line 38, in Claim 19, after "the", delete "first"

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*